(12) United States Patent
Geissler et al.

(10) Patent No.: US 8,864,899 B2
(45) Date of Patent: Oct. 21, 2014

(54) PVD METAL EFFECT PIGMENT HAVING GRADIENT ON NANOSCALE METAL PARTICLES, METHOD FOR THE PRODUCTION THEREOF AND USE THEREOF

(75) Inventors: Bernhard Geissler, Schwarzenbruck (DE); Wolfgang Herzing, Neunkirchen (DE); Frank Henglein, Nürnberg (DE); Ralph Schneider, Lauf (DE); Martin Fischer, Königstein (DE)

(73) Assignee: Eckart GmbH (DE)

( * ) Notice: Subject to any disclaimer, the term of this patent is extended or adjusted under 35 U.S.C. 154(b) by 653 days.

(21) Appl. No.: 13/146,254

(22) PCT Filed: Jan. 28, 2010

(86) PCT No.: PCT/EP2010/000515
§ 371 (c)(1),
(2), (4) Date: Jul. 26, 2011

(87) PCT Pub. No.: WO2010/086165
PCT Pub. Date: Aug. 5, 2010

(65) Prior Publication Data
US 2011/0293547 A1    Dec. 1, 2011

(30) Foreign Application Priority Data

Jan. 28, 2009    (DE) .......................... 10 2009 006 550

(51) Int. Cl.
*C09C 1/62*    (2006.01)
*C09C 1/00*    (2006.01)
*C09C 1/64*    (2006.01)

(52) U.S. Cl.
CPC ......... *C09C 1/0015* (2013.01); *C09C 2200/502* (2013.01); *C09C 2200/50* (2013.01);

(Continued)

(58) Field of Classification Search
CPC .............................. C09C 1/62; C09C 2220/20
See application file for complete search history.

(56) References Cited

U.S. PATENT DOCUMENTS

| | | | |
|---|---|---|---|
| 2,839,378 A | 6/1958 | McAdow et al. | |
| 2,941,894 A | 6/1960 | McAdow et al. | |

(Continued)

FOREIGN PATENT DOCUMENTS

| | | | |
|---|---|---|---|
| CN | 1542059 A | 11/2004 | |
| CN | 1637079 A | 7/2005 | |

(Continued)

OTHER PUBLICATIONS

"PVD Aluminum Pigments Superior Brilliance for Coatings and Graphic Arts", Coatings Journal, vol. 84, A6 225264, Jul. 2001, pp. 240-254.*

(Continued)

*Primary Examiner* — Pegah Parvini
(74) *Attorney, Agent, or Firm* — Ostrolenk Faber LLP

(57) ABSTRACT

A platelet-shaped PVD metallic effect pigment having first and second outer faces, the platelet-shaped PVD metallic effect pigment having at least one PVD layer, the at least one PVD layer including elemental metal with clusters of elemental metal and metal oxide. The amounts of elemental metal in the first outer face and in the second outer face of the PVD metallic effect pigment are different from one another and they differ by at least 10 atom %. The disclosure further relates to a method for producing these platelet-shaped PVD metallic effect pigments, and to their use.

22 Claims, 28 Drawing Sheets

(52) U.S. Cl.
CPC ....... *C09C 2200/402* (2013.01); *C01P 2004/54* (2013.01); *C09C 2200/20* (2013.01); *C01P 2002/70* (2013.01); *C09C 1/0078* (2013.01); *C09C 2200/401* (2013.01); *C09C 2200/40* (2013.01); *C09C 2200/307* (2013.01); *C01P 2004/04* (2013.01); *C09C 1/0018* (2013.01); *C09C 1/62* (2013.01); *C09C 1/64* (2013.01); *C09C 2220/20* (2013.01); *C09C 2200/505* (2013.01); *C09C 2200/24* (2013.01)
USPC ........................................................ 106/400

(56) References Cited

U.S. PATENT DOCUMENTS

| | | | |
|---|---|---|---|
| 4,321,087 A | 3/1982 | Levine et al. | |
| 4,364,995 A | 12/1982 | Crawford et al. | 428/336 |
| 4,430,366 A | 2/1984 | Crawford et al. | |
| 5,766,827 A | 6/1998 | Bills et al. | |
| 5,855,660 A | 1/1999 | Bujard et al. | |
| 7,819,966 B2 | 10/2010 | Kaupp | |
| 2004/0177788 A1 | 9/2004 | Rick et al. | 106/415 |
| 2006/0070552 A1 | 4/2006 | Loch et al. | 106/418 |
| 2008/0102269 A1 | 5/2008 | Herzing et al. | 428/336 |
| 2009/0013906 A1 | 1/2009 | Fischer et al. | |
| 2009/0056591 A1 | 3/2009 | Schmidt et al. | |
| 2010/0196296 A1 | 8/2010 | Geissler et al. | |

FOREIGN PATENT DOCUMENTS

| | | |
|---|---|---|
| DE | 69601432 T2 | 10/1999 |
| DE | 102005037612 A1 | 2/2007 |
| DE | 102006009130 A1 | 8/2007 |
| DE | 102007007908 A1 | 8/2007 |
| EP | 0874026 A2 | 10/1998 |
| EP | 1144711 B1 | 10/2001 |
| EP | 1552606 A1 | 4/2005 |
| JP | 62-228462 | 10/1987 |
| JP | 02-000669 | 1/1990 |
| JP | 03-002385 | 1/1991 |
| JP | 03-074472 | 3/1991 |
| WO | WO 99/35194 | 7/1999 |
| WO | WO 2007/093401 A2 | 8/2007 |
| WO | WO 2009/012995 A1 | 1/2009 |

OTHER PUBLICATIONS

Chinese Office Action and English translation dated Mar. 5, 2013 issued in corresponding Chinese Patent Application No. 201080015050.7.

International Search Report dated Jun. 18, 2010, issued in corresponding international application No. PCT/EP2010/000515.

Notice of Reasons for Rejection dated Mar. 25, 2014 in corresponding Japanese Patent Application No. 2011-546711 (with English language translation).

* cited by examiner

1. Source roll
2. and 3. Deflecting roll
4. Pickup roll
5. and 6. Transmittance measurement
7. Oscillating quartz measurement
8. Vaporizer boat
9. and 10. Shutter entrance and shutter exit
11. Vacuum chamber
12. Substrate
16. Vapor deposition section 13. Oxygen supply
14. Masking shutter
15. Masking shutter
17. Horizontal distance of oxygen opening to axis of symmetry: Δl
18. Length L of shutter aperture

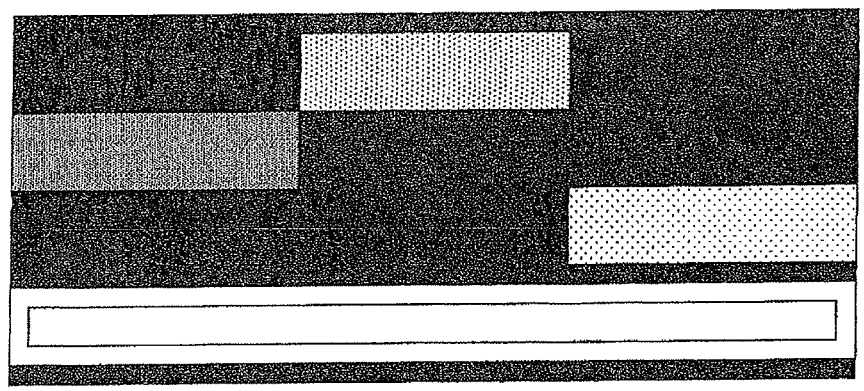
Figure 4
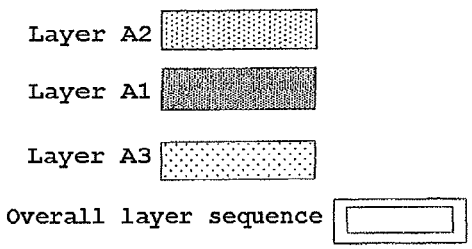

19. Distance of shutter aperture to middle point of coating length: y

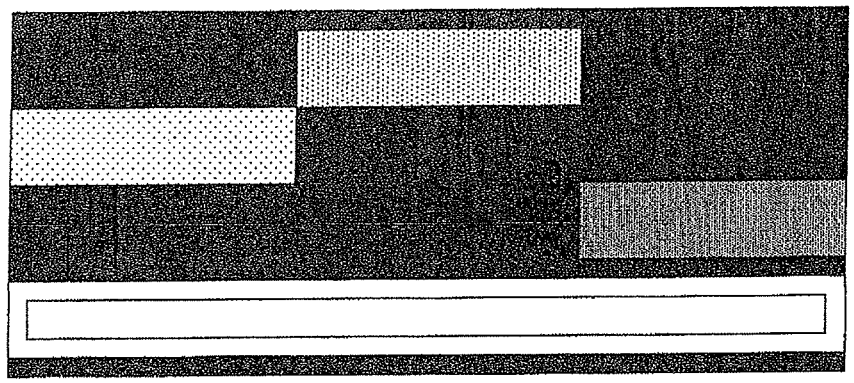
Figure 6
Layer C2 
Layer C3 
Layer C1 
Overall layer sequence 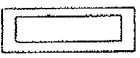

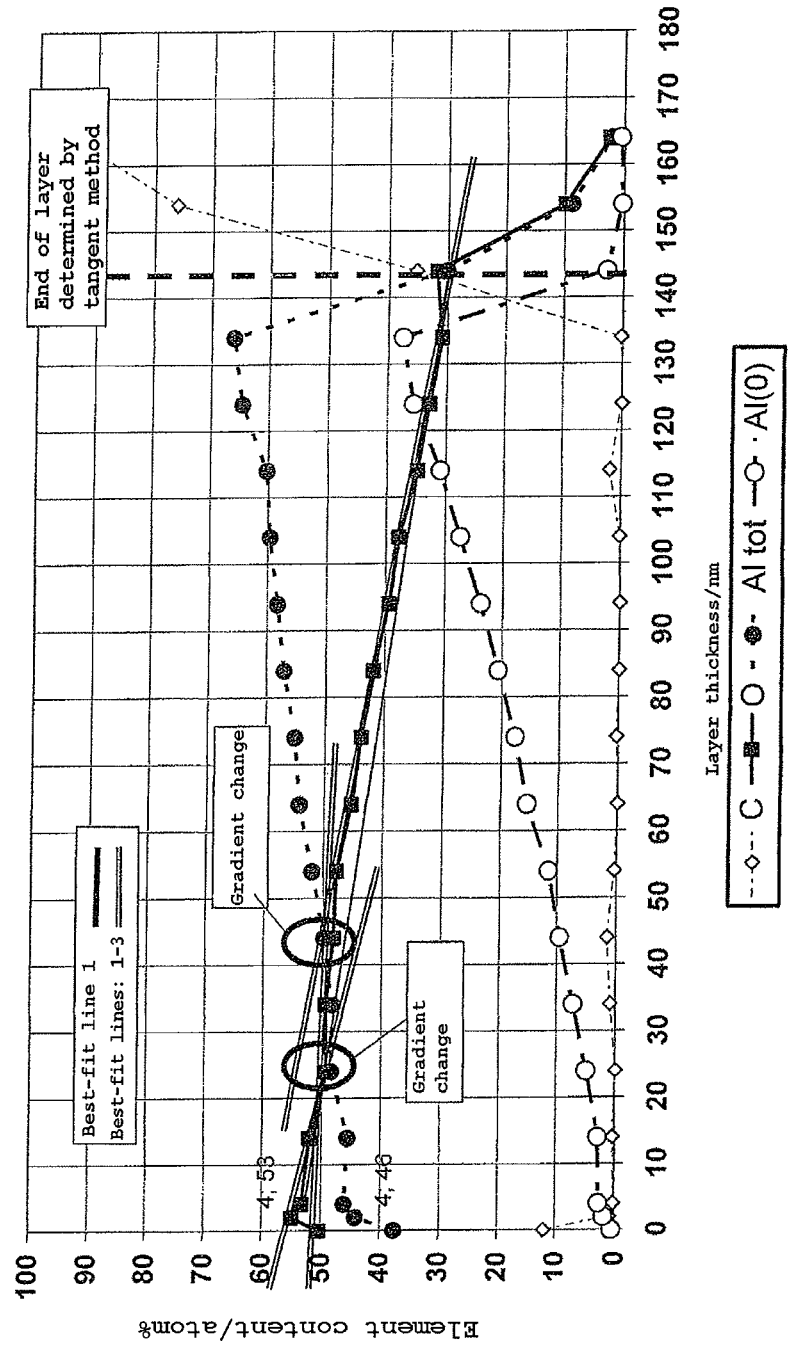

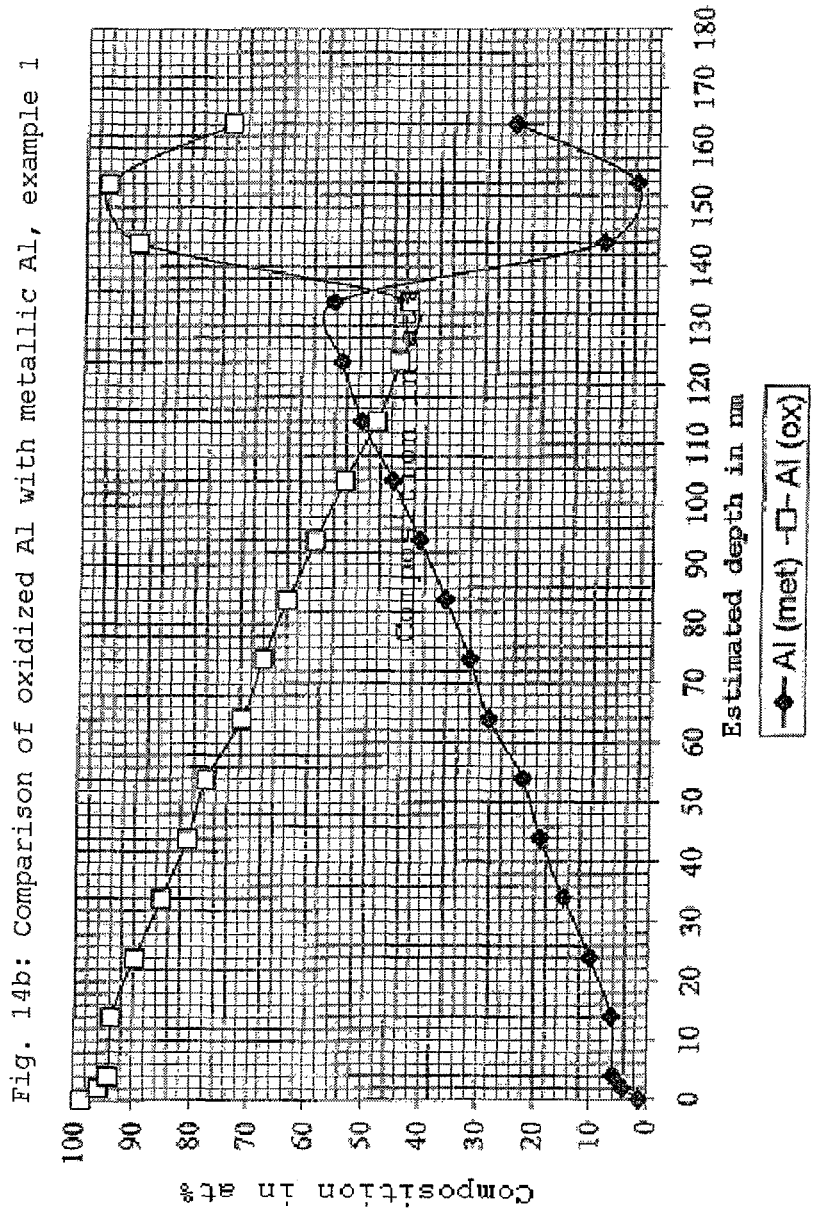

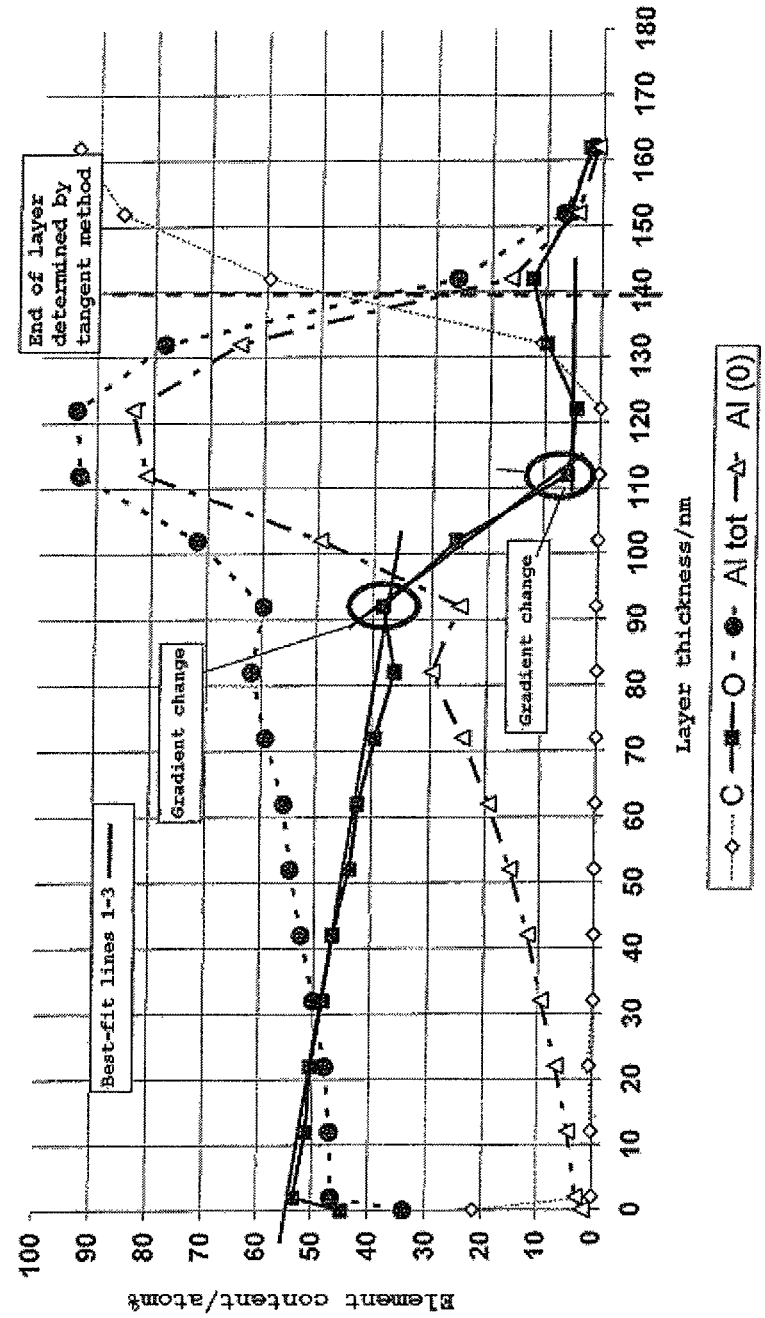

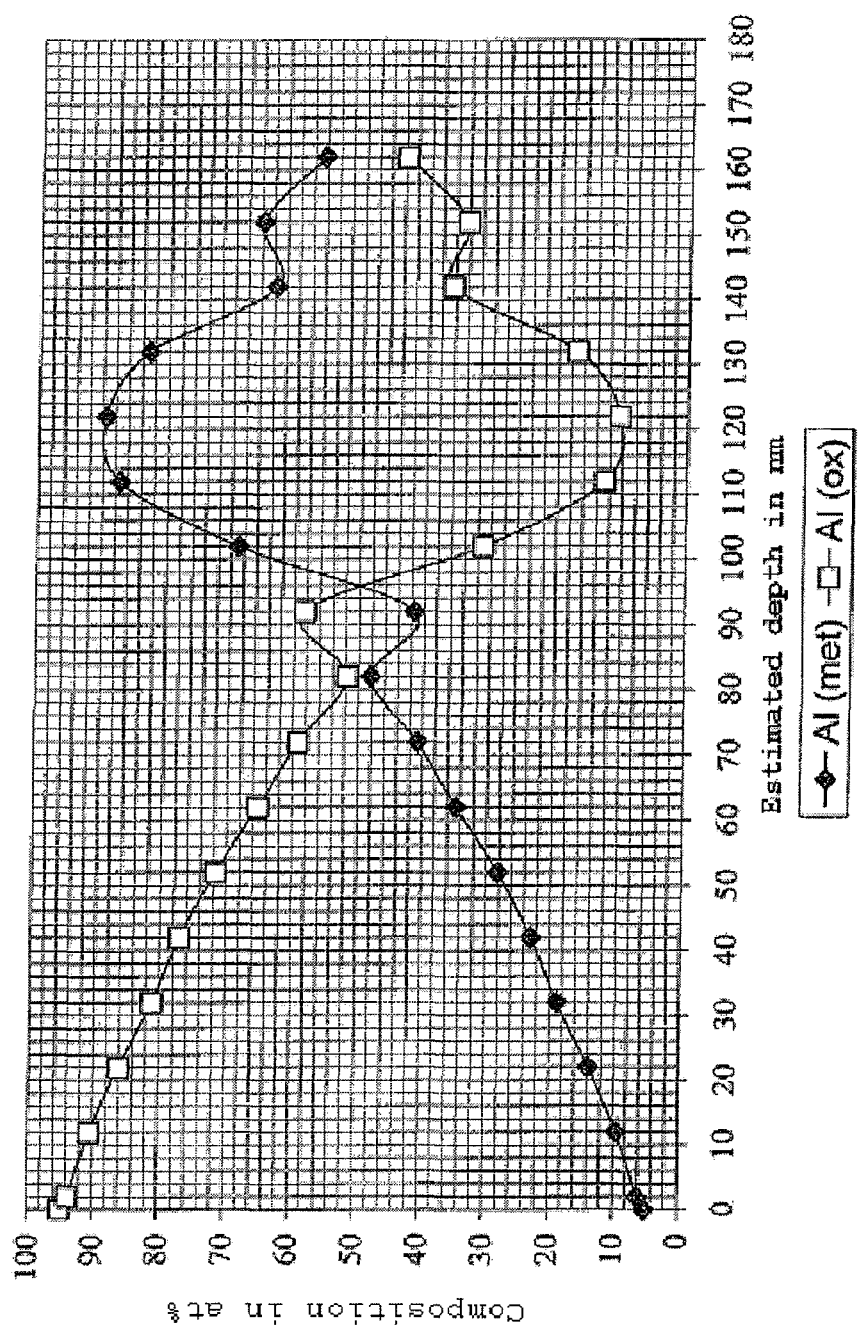
Fig 15b: Comparison of oxidized Al with metallic Al, example 2

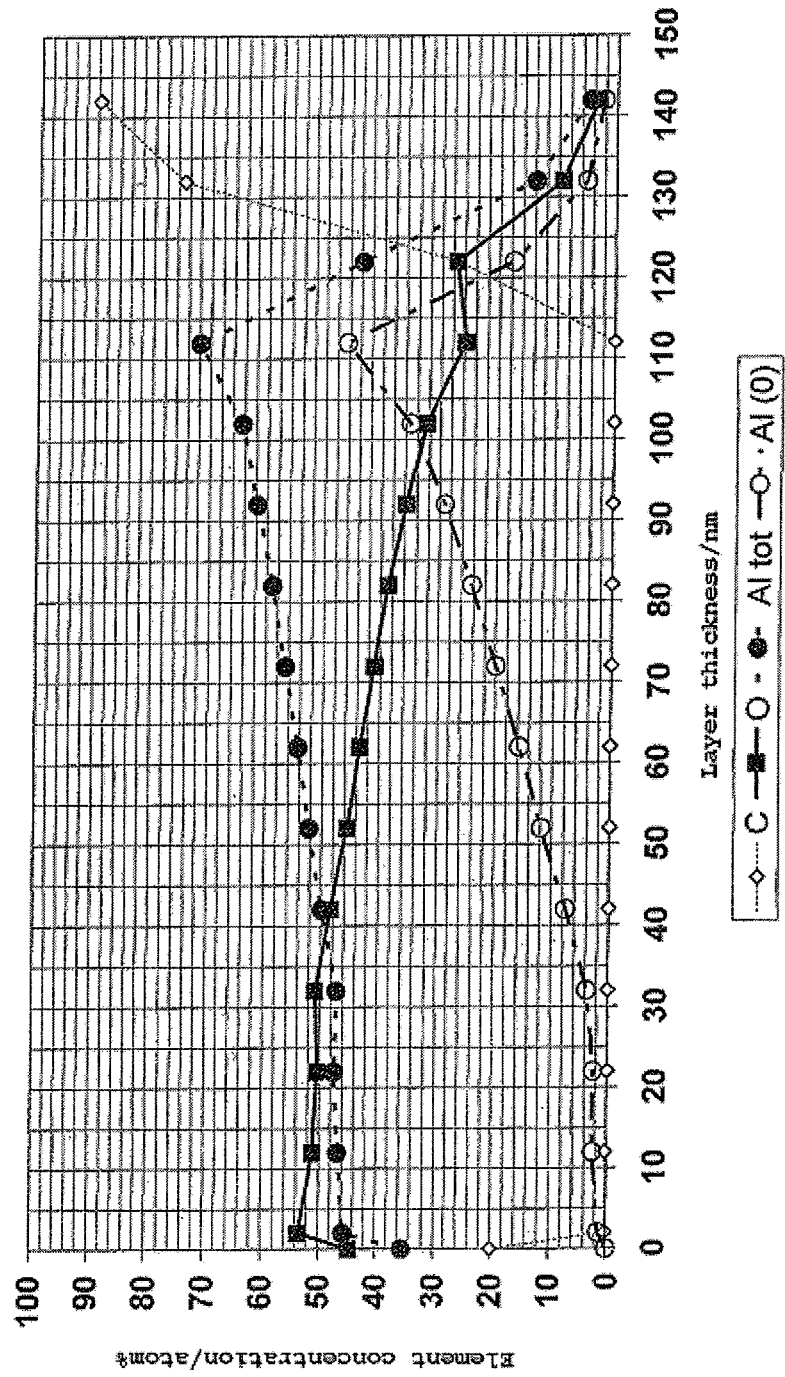

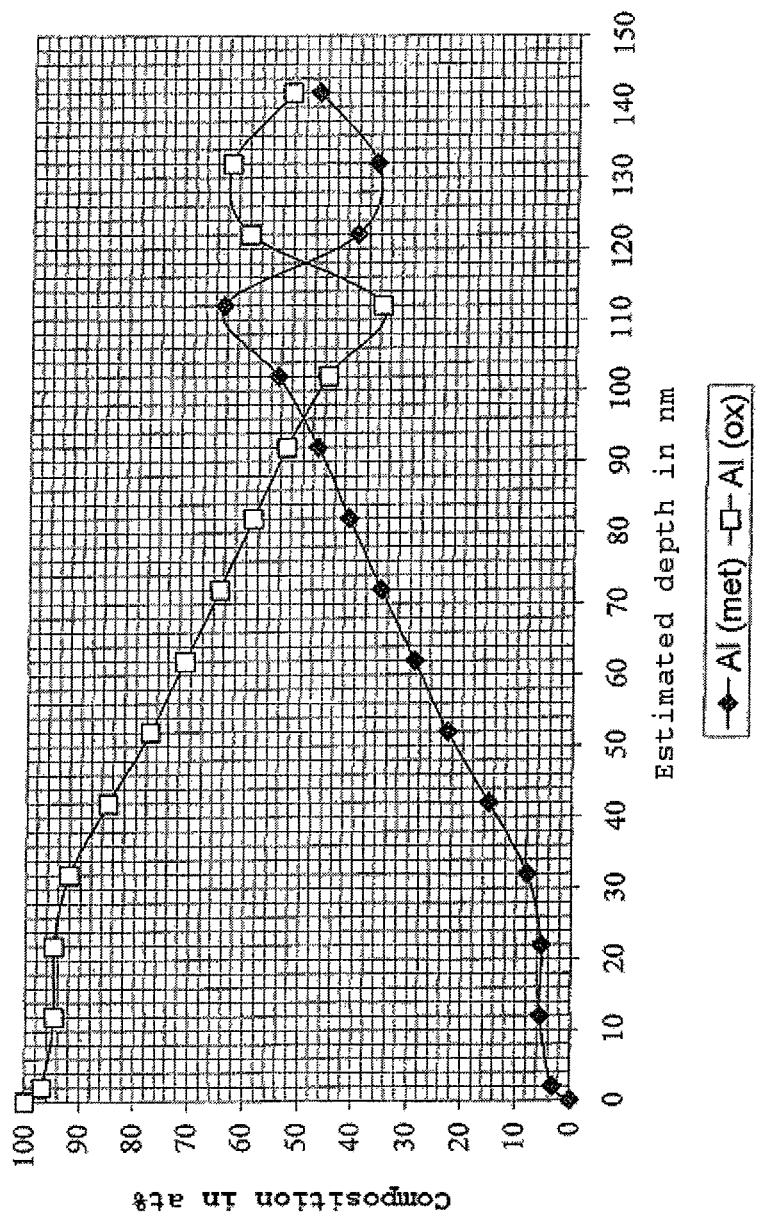
Fig. 16b: Comparison of oxidized Al with metallic Al

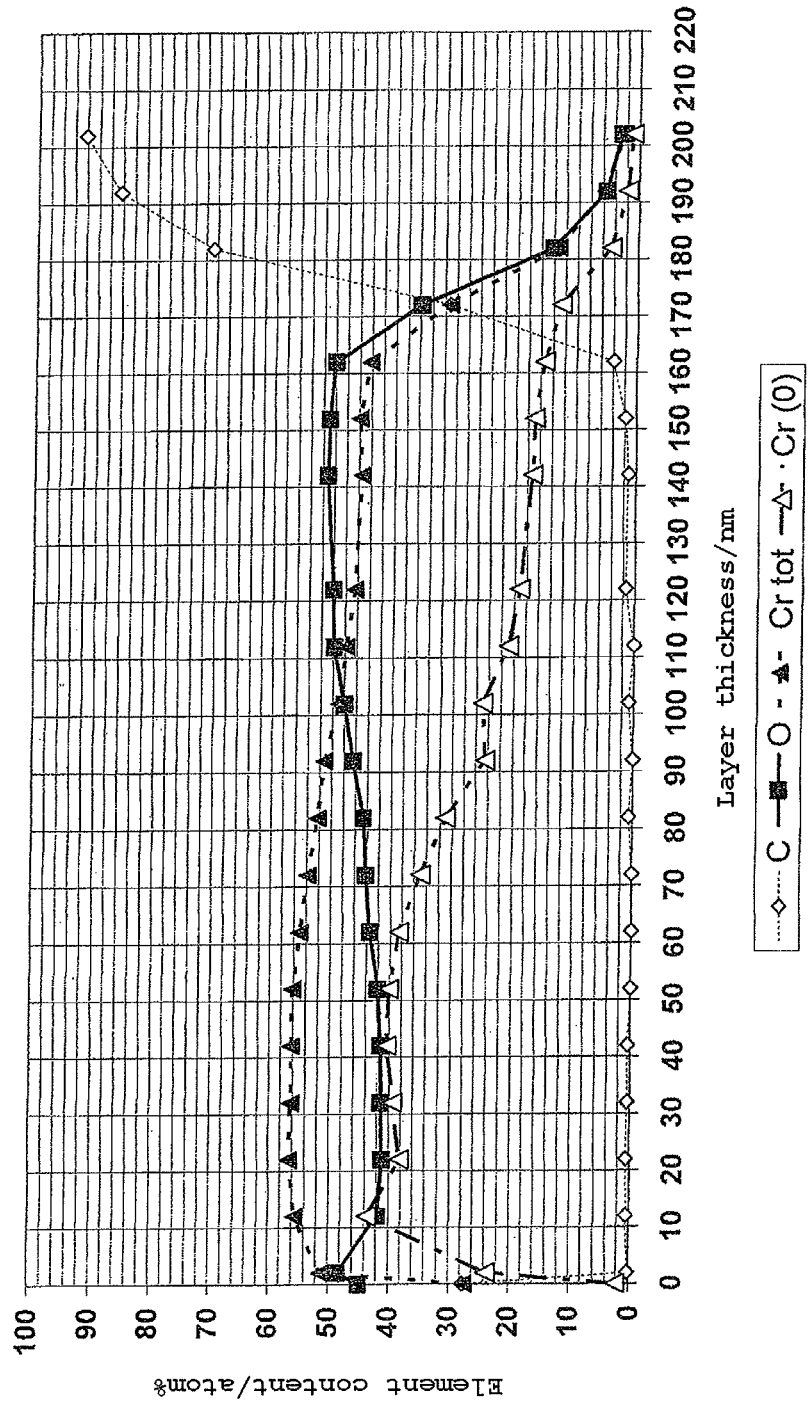
Fig. 17a: ESCA layer thickness profile, example 4

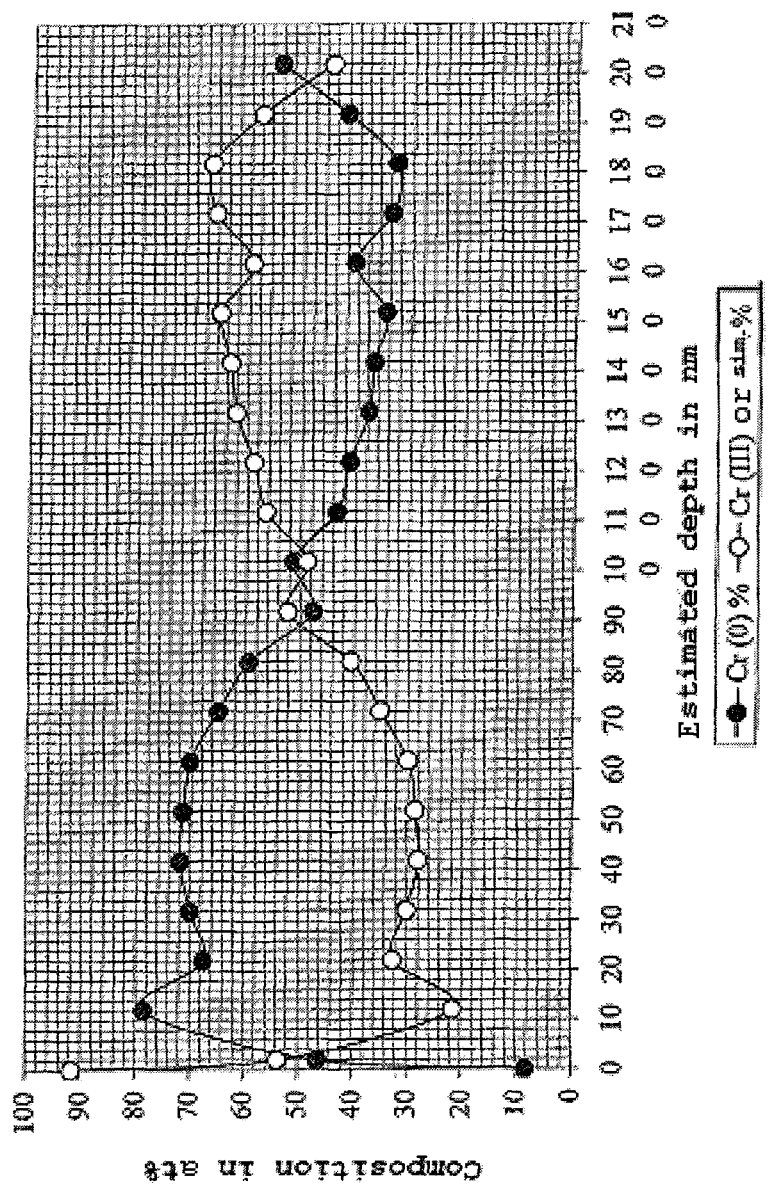
Fig. 17b: Comparison of oxidized Cr with metallic Cr

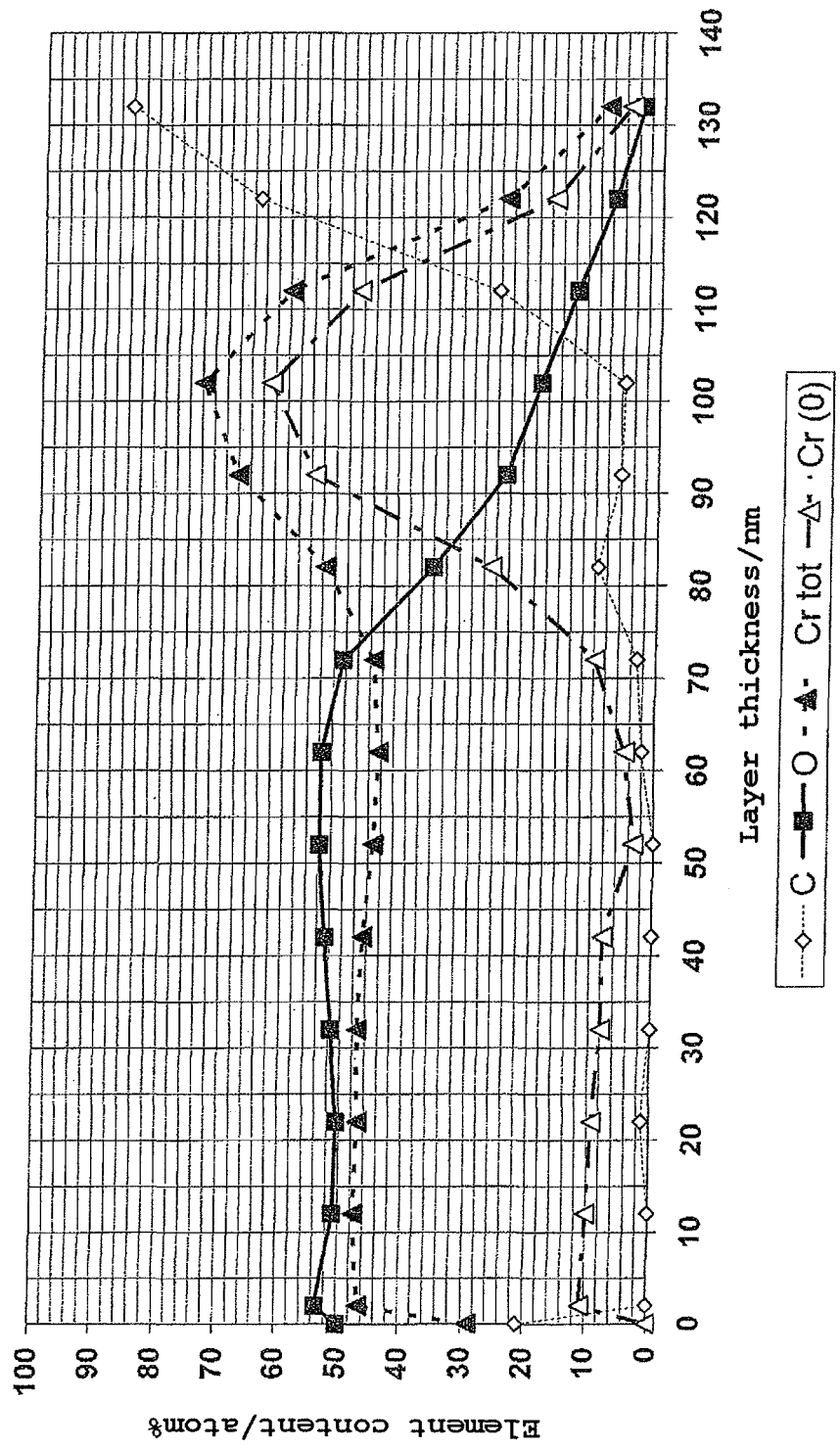
Fig. 18a: ESCA sputter profile of example 5

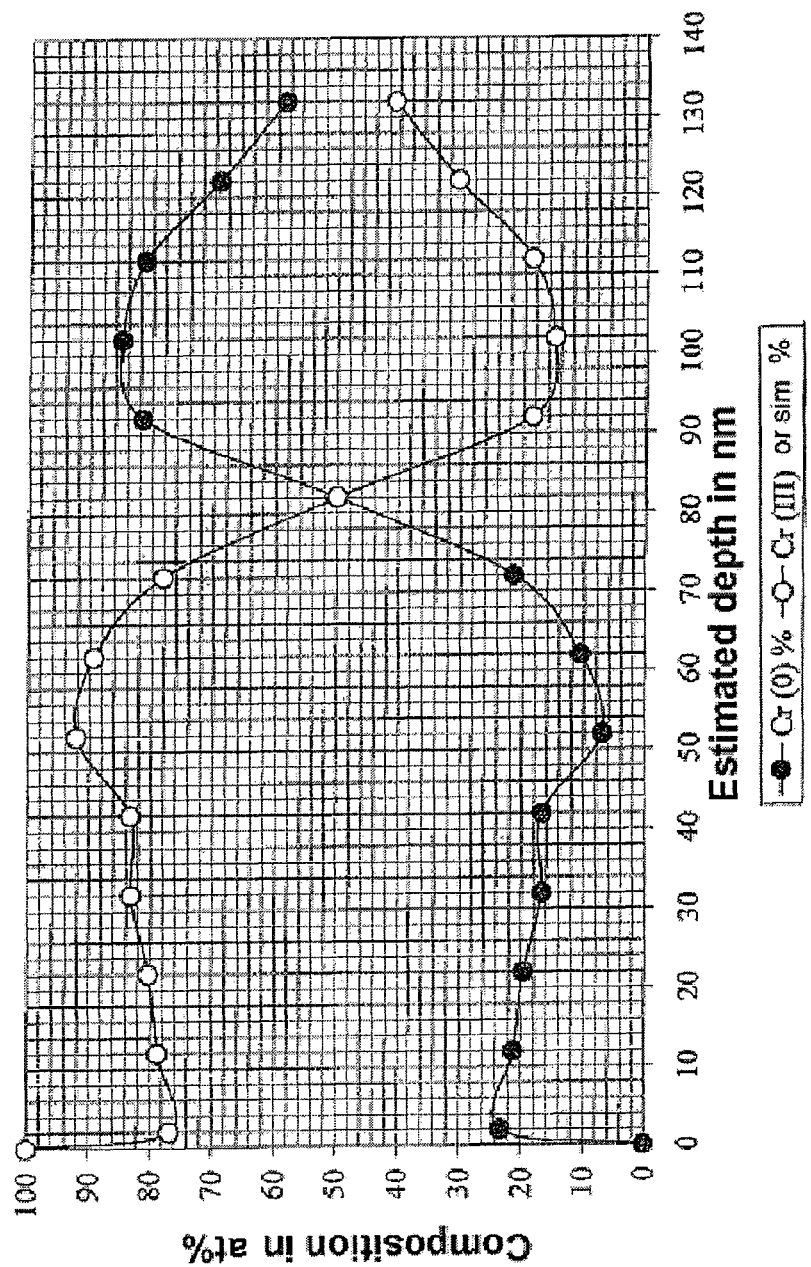
Fig. 18b: Comparison of oxidized Cr with metallic Cr

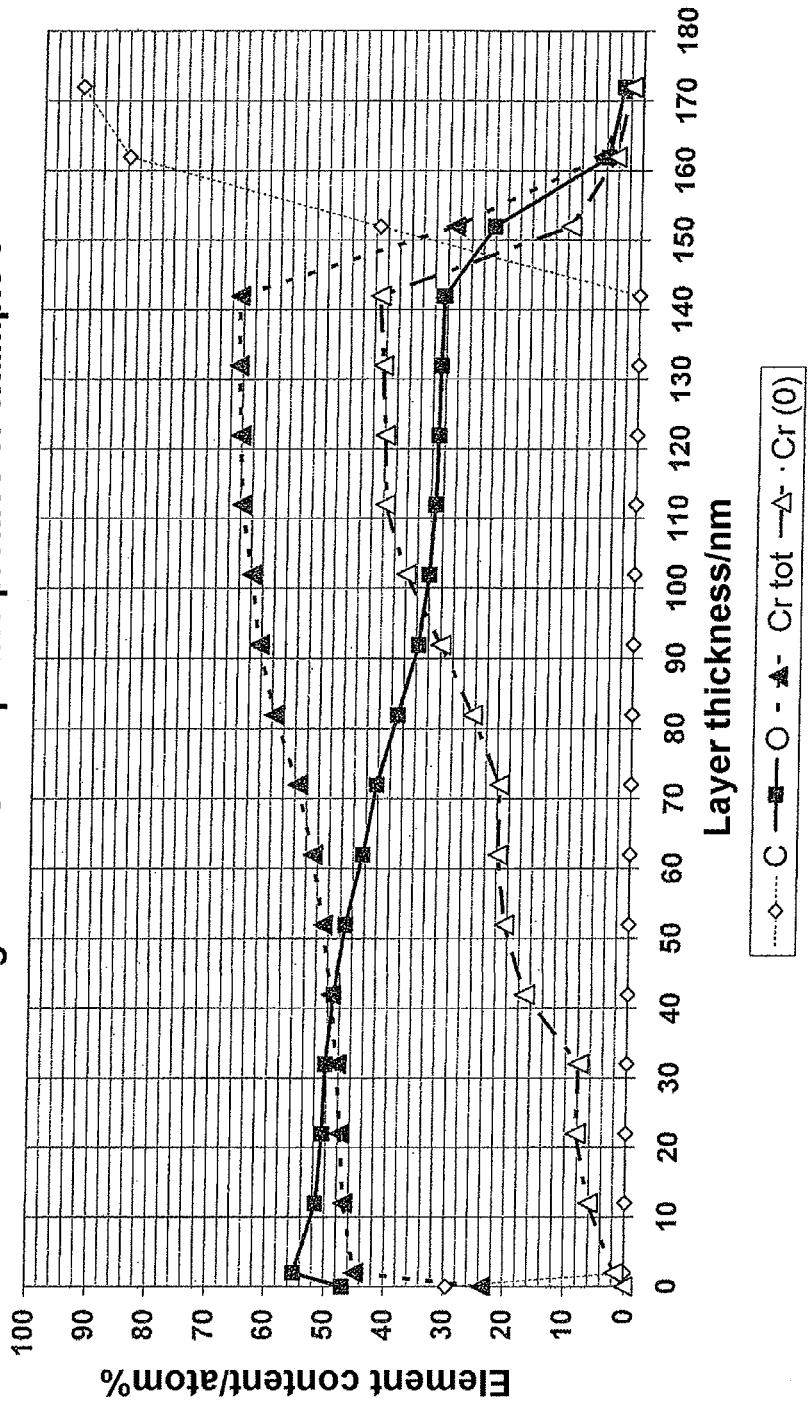

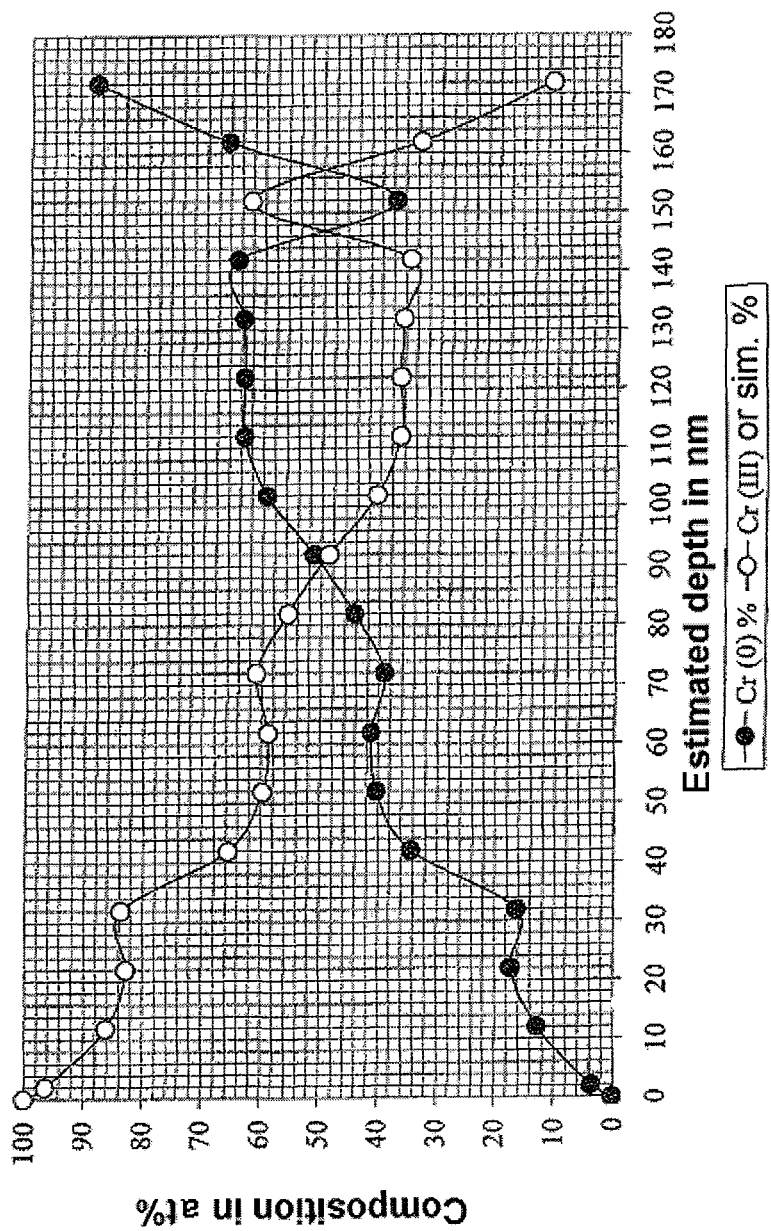

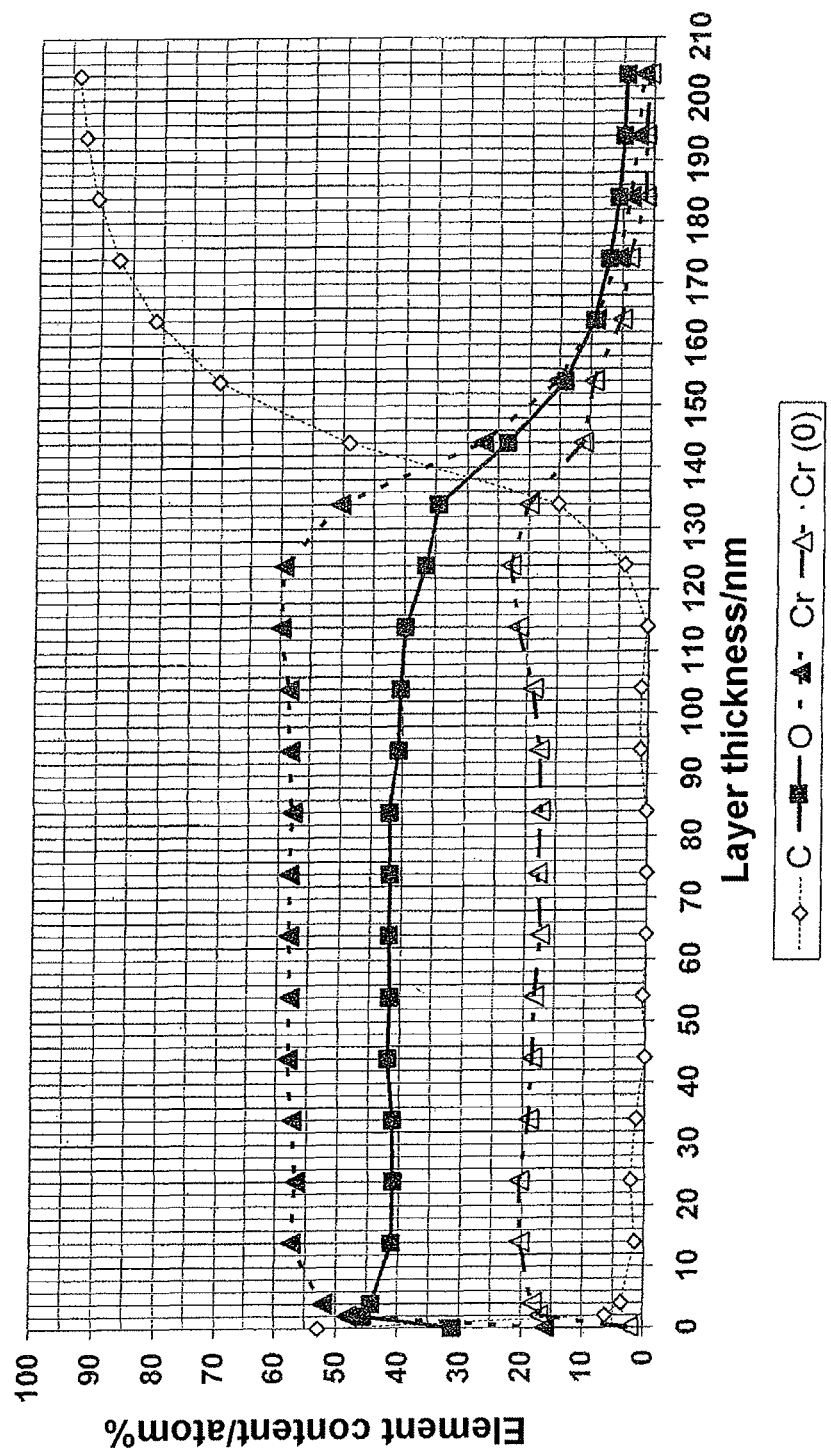

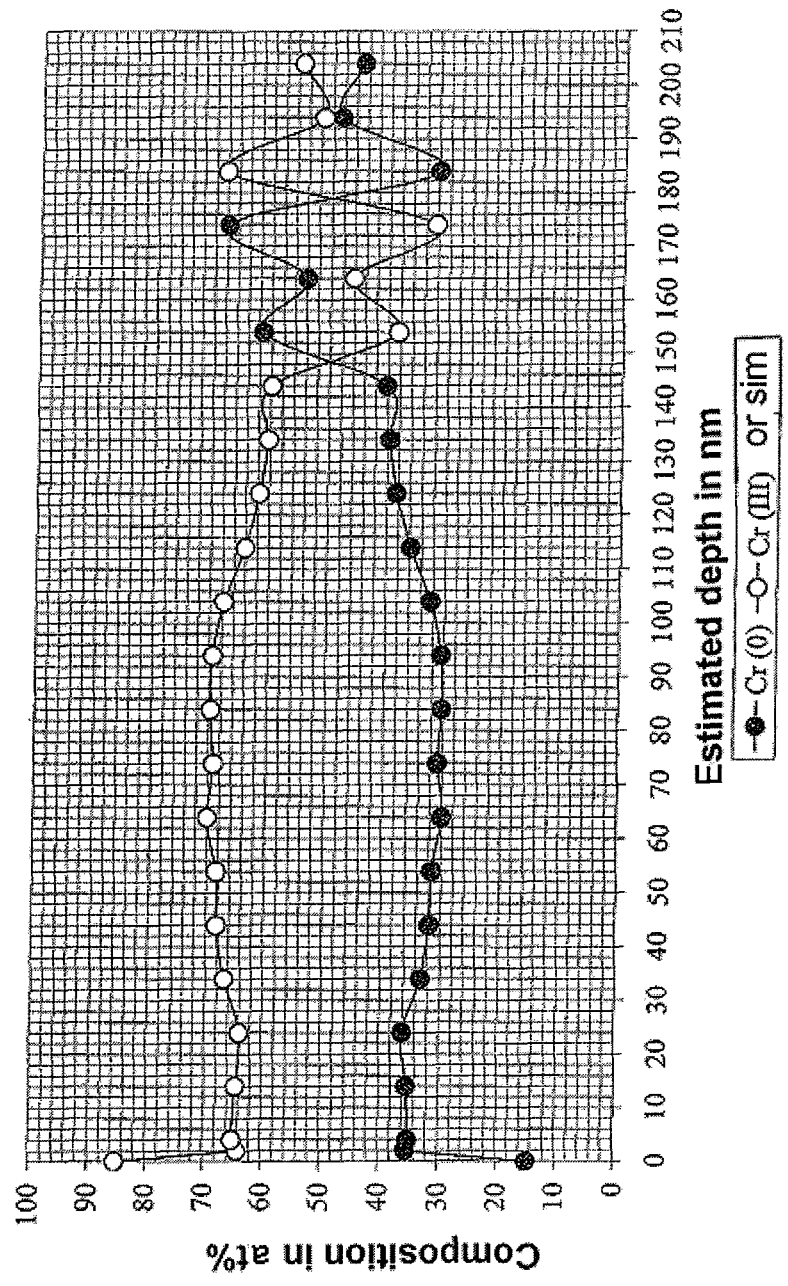
Fig. 20b: Comparison of oxidized Cr with metallic Cr for comparative example 8

PVD METAL EFFECT PIGMENT HAVING GRADIENT ON NANOSCALE METAL PARTICLES, METHOD FOR THE PRODUCTION THEREOF AND USE THEREOF

CROSS REFERENCE TO RELATED APPLICATIONS

The present application is a 35 U.S.C. §371 National Phase conversion of PCT/EP2010/000515, filed Jan. 28, 2010, which claims benefit of German Application No. 10 2009 006 550.4, filed Jan. 28, 2009, the disclosures of which are incorporated herein by reference. The PCT International Application was published in the German language.

TECHNICAL FIELD

The present invention relates to a platelet-shaped PVD metallic effect pigment having first and second outer faces, the platelet-shaped PVD metallic effect pigment having at least one PVD layer and the at least one PVD layer comprising metal oxide and clusters of elemental metal, the amount of clusters of elemental metal in the first outer face and in the second outer face of the PVD metallic effect pigment being different from one another and differing by at least 10 atom %. The invention further relates to the use of these PVD metallic effect pigments and also to their production.

BACKGROUND

Metallic effect pigments have been used for many years in coatings in order to generate a metallic effect.

Conventional metallic effect pigments consist of platelet-shaped metallic pigments whose effect derives from the directed reflection of incident light at the metallic pigments of planar form which are oriented in parallel in the respective application medium.

Typical fields of application of the metallic effect pigments are the coatings industry, especially the automotive industry, the printing industry, and the plastics industry.

The metallic effect is described by certain parameters. These parameters include the brilliance, characterized by sparkle and metallic luster, the lightness, and the flop, i.e., the change in lightness as a function of incident angle and/or viewing angle, and the covering power. In the case of colored metallic coatings, further parameters are the chroma and the color flop ("two-tone"). The luster is determined by the ratio of reflected light to scattered light in relation to a standard.

Key factors influencing the metallic effect include the particle morphology and the form factor, i.e., the ratio of average particle diameter to average particle thickness, of the pigments, the thickness of the particles, and also their surface roughness, the particle size, the particle-size distribution, and the orientation of the pigment parallel to the surface of a coating material or plastic.

In metallic effect pigment particles with relatively large diameters and uniform morphology, reflection is relatively high, and this is manifested in high metallic brilliance, improved lightness, and strong flop, whereas, for pigments with relatively low particle diameters, the scattering fraction is very high, leading to good covering power.

The covering power is determined above all, however, by the thickness of the metallic pigments. The thinner the metallic pigments, the better their specific covering power, i.e., the covering power per unit weight.

On the part of the printing, coatings, plastics, and cosmetics industries there is a great interest in metallically dark metallic effect pigments.

For relatively high-value applications, particularly thin aluminum effect pigments have been developed, and are produced via PVD techniques.

Metallic effect pigments produced by PVD techniques have been known for some considerable time. They are notable for extremely high luster, immense covering power, and unique optical properties. Owing to their low thickness of around 30 to 70 nm and their extremely smooth surfaces, they have a tendency, following application, to conform very closely to the substrate. If the substrate is very smooth, the result is virtually a mirrorlike appearance.

Of the pure metallic effect pigments, only aluminum effect pigments have been disclosed commercially to date. Examples thereof are Metalure® (manufactured by Avery Dennison, sold by Eckart), Decomet® (Schlenk) or Metasheen® (Ciba).

Such pigments represent the "silver" hue in its highest embodiment.

Pigments produced by PVD techniques on the basis of metallic layers are described in more detail in U.S. Pat. No. 2,839,378. Described therein is the manufacture of mirrorlike pigments with extremely thin layer thicknesses, which are applied by vapor deposition to a substrate provided with a "release layer". After the metal layers have been applied and the film has been detached, the pigments are comminuted to the desired particle size by means of mechanical action.

The application of pigments manufactured in this way in coating formulations is described in detail in U.S. Pat. No. 2,941,894. That patent emphasizes the high reflectivities, the low level of pigmentation, i.e., a low level of pigment concentration in the application medium, and the high specific hiding power or covering power of the pigments.

A method for producing metallic pigments by means of vapor-deposition techniques with a thickness of 35 to 45 nm is described in greater precision in U.S. Pat. No. 4,321,087 and entails the application of a release layer, the metalizing operation, the detachment procedure in a solvent bath, the concentrating of the detached particles, and the comminution of the particles to the desired pigment size by means of ultrasound.

WO99/35194 describes pigments having a three-layer construction, in which the inherent color of an intermediately situated metal layer is not altered by two external dielectric support layers. A disadvantage with this production method is that it involves three layers to be applied by vapor deposition in order to be able to produce the multilayer construction, with the production costs being greatly increased as a result.

EP 1 522 606 A1 describes the production of a sheet with black aluminum oxide. In this case, neither effect pigments nor multilayer structures are disclosed. The sheets disclosed here have no notable metallic effect with luster and flop.

U.S. Pat. No. 4,430,366 describes the production of sheets comprising a mixture of metal and metal oxide. Here, again, no effect pigments are referred to.

WO 2007093401 A2 describes dark metallic effect pigments comprising a layer with a largely homogeneous composition in terms of oxygen and metal. A disadvantage is that the method for producing these effect pigments is costly and inconvenient.

DE 69601432 T2 relates to a method for thermal generation of an image on a substrate, in which an oxygen-containing, black aluminum layer is applied in such a way that it has an optical transmittance of at least 0.3 at a wavelength between 200 and 1100 nm. This document does not relate to the provision of effect pigments.

EP 1 144 711 B1 discloses a method for producing reflective color pigments, in which, atop a reflection layer, at least one layer is applied which produces a color change, said layer comprising a transparent material having a refractive index of greater than 1.8, typically metal oxide, and a light-absorbing metal, application taking place with simultaneous evaporation, and the light-absorbing metal being different from the metal of the metal oxide. In terms of process engineering, the method is very difficult to control.

DE 10 2007 007 908 A1 discloses dark metallic effect pigments produced by PVD techniques. They have a largely homogeneous composition and possess a relatively high oxygen content of 25 to 58 atom %. The layer is dark, since the metal is in the form of small metal clusters dispersed in metal oxide. Effect pigments of this kind produce dark but highly lustrous effect pigments with a pronounced light/dark flop. The method for producing these PVD metallic effect pigments with a homogeneous composition is likewise costly and inconvenient in terms of process engineering, and permits only low production rates.

In order to ensure the high oxygen content and the homogeneous chemical composition, it is necessary to exert extensive monitoring, during the coating operation, of the metal vaporization rate and the oxygen supply rate over both the width and the length of the coating belt. This necessitates a very high level of cost and complexity particularly in a production plant: for instance, over the belt width, for example, the metal layer thickness can be measured in situ by means of transmittance measurements, and adjusted. It is very difficult, however, to monitor the operation over the entire vapor-deposition zone, i.e., over width and length of the belt.

OBJECTS OF THE INVENTION

It is an object of the invention to provide neutral, covering, metallic, discreetly colored or black, mirrorlike metallic effect pigments with a light/dark flop which is up to occasionally very high, and which preferably are easy to produce.

A further object is to find a cost-effective and simple method for producing such metallic effect pigments. The pigments are to be producible by a method which is readily monitorable. The method is also, preferably, to allow high production rates.

SUMMARY

The object on which the invention is based is achieved through provision of a platelet-shaped PVD metallic effect pigment having first and second outer faces, the platelet-shaped PVD metallic effect pigment having at least one PVD layer and the at least one PVD layer comprising elemental metal with clusters of elemental metal and metal oxide, the amount of elemental metal in the first outer face and in the second outer face of the PVD metallic effect pigment being different from one another and differing by at least 10 atom %.

DETAILED DESCRIPTION

Preferred developments of the PVD metallic effect pigment of the invention are specified in claims 2 to 11.

The PVD metallic effect pigment of the invention may comprise or consist of one or more PVD layers.

A platelet-shaped PVD metallic effect pigment is preferably a metallic effect pigment whose diameter is at least ten times the thickness of the PVD metallic effect pigment. Preferably, the diameter is at least 20 times, preferably at least 50 times, more preferably at least 80 times, even more preferably at least 100 times, the thickness. Also very suitable are diameters which amount to 200 times, 400 times, 500 times or 1000 times the thickness.

Outer face of the PVD metallic effect pigments means the top or bottom face of the platelet-shaped PVD metallic effect pigment, and the PVD metallic effect pigment may comprise one, two, three or more PVD layers. The outer faces of the PVD metallic effect pigment do not refer, for instance, to anticorrosion layers applied to the PVD metallic effect pigment.

The indication "atom %" relates to all of the constituents, i.e., to elemental metal, oxidized metal, and oxygen, with oxidized metal and oxygen being present in the form of metal oxide, in one (number: 1) PVD layer.

In contradistinction to metallic effect pigments obtained by deformational milling, the PVD metallic effect pigments of the invention are additionally notable for an extremely planar surface, more particularly without depressions and/or elevations. In contradistinction to metallic effect pigments obtained by deformational milling, the marginal region is not torn or frayed, but instead has typically linear fracture edges.

A particular feature of the PVD metallic effect pigment of the invention is that it has an asymmetric construction. The asymmetry lies in particular in the different amount of elemental metal over the thickness of the PVD layer. A PVD layer in accordance with the invention is one (number: 1) layer applied in one (number: 1) PVD deposition operation by means of physical vapor deposition (PVD). The asymmetry of the PVD layer is hence attributable to the inhomogeneous composition of the PVD layer, which is a result of nonuniform distribution of elemental metal and metal oxide over the thickness of the PVD layer of the PVD metallic effect pigment of the invention.

The amount of elemental metal between the first and second outer faces of the platelet-shaped PVD metallic effect pigment differs by at least 10 atom %, preferably by at least 14 atom %, more preferably by at least 17 atom %. According to one preferred development of the invention, the difference is situated in a range between 21 and 96 atom %, more preferably in a range between 24 and 87 atom %, even more preferably in a range between 27 and 76 atom %. Also having proven very suitable is a difference from a range from 31 to 68 atom % or from a range between 37 and 46 atom %.

Besides elemental metal, the PVD metallic effect pigments of the invention comprise metal oxide. Here, in its profile over the thickness of one (number: 1) PVD layer, the amount of elemental metal is in largely inverse, preferably inverse, correlation with the amount of elemental metal oxide, and vice versa.

In accordance with the invention, in a PVD layer, the metal of which the metal oxide is formed is the same as the elemental metal in that PVD layer. Expressed in a different way, the elemental metal and the metal of the metal oxide in a PVD layer are preferably not different from one another. The elemental metal may therefore be present in distribution in metal oxide, or the metal oxide may be present in distribution in metal, this being dependent on the respective fractions of elemental metal and of metal oxide.

The elemental metal and the metal of the metal oxide in one (number: 1) PVD layer are the same because the PVD layer is applied with reactive vaporization of a metal in the presence of oxygen. In the production of the PVD metallic effect pigments of the invention, therefore, there is no vaporization of metal oxide and metal alongside one another.

In accordance with the invention, the metal may be a single metal or a metal alloy, or the oxide of a single metal or the oxide of a metal alloy.

The elemental metal present in the form of metal clusters in the PVD metallic effect pigment of the invention significantly determines the coloring of the PVD metallic effect pigment of the invention. The fraction present as metal oxide has no part or only a very much smaller part in the coloring of the PVD metallic effect pigment of the invention.

It has surprisingly emerged that the PVD metallic effect pigments of the invention have surprising optical properties. The part of the PVD metallic effect pigment of the invention that has the face with the higher amount of elemental metal acts either substantially as a metallic reflector or substantially as a metallic absorber. The part of the PVD metallic effect pigment of the invention that has the face with the higher amount of elemental metal in the form of metal cluster has substantially a coloring effect.

It has surprisingly turned out, furthermore, to be the case that the asymmetric PVD metallic effect pigments of the invention, in application, generate a homogeneous and attractive visual impression. In application, as for example in a coating such as an ink, printing ink, paint, cosmetic, etc., approximately 50% of the PVD metallic effect pigments of the invention that have the face having the higher content of elemental metal in the form of metal cluster, and about 50% of the PVD metallic effect pigments of the invention that have the face having the lower content of elemental metal in the form of metal cluster, face the eye of the observer. The observer, surprisingly, does not see an irregular color impression, but instead a uniform color impression. This effect was especially surprising for PVD metallic effect pigments provided from one side with a continuous metal layer.

It is surprising, furthermore, that the PVD metallic effect pigments of the invention have a lower pigment thickness in comparison to PVD metallic effect pigments which have a largely homogeneous distribution of metal oxide and elemental metal in the form of metal clusters in one (number: 1) PVD layer and also generate a dark hue.

It has turned out, surprisingly, in addition, that the PVD metallic effect pigments of the invention allow the provision of a gray, preferably dark-gray, PVD metallic effect pigment which exhibits a high light/dark flop. It is thought that this optical effect is attributable to the asymmetry of the PVD metallic effect pigments of the invention, resulting in an asymmetric coloration depending on which face of the PVD metallic effect pigment is facing the viewer. On account of the averaging of the received color for the viewer, it is possible to obtain a hitherto unavailable metallic effect pigment in the gray range, with a strong light/dark flop.

In accordance with one development of the invention, the platelet-shaped PVD metallic effect pigment has two PVD layers arranged one atop the other, each comprising elemental metal with clusters of elemental metal and metal oxide, the amount of elemental metal in the first outer face and in the second outer face of the PVD metallic effect pigment being different from one another and differing by at least 10 atom %.

With this variant of the invention, two PVD layers are applied by vapor deposition directly over one another. Here, the metal of the elemental metal and of the metal oxide in both layers may be the same as or different from one another.

For example, the metal of the first PVD layer may be aluminum or aluminum oxide, and the metal of the second PVD layer may be chromium or chromium oxide, or titanium or titanium oxide.

In accordance with the invention it is also possible, however, for the metal of the first PVD layer to be aluminum or aluminum oxide and the metal of the second PVD layer to be likewise aluminum or aluminum oxide, with the respective fractions of aluminum oxide or elemental aluminum in the first and second PVD layers being preferably different from one another.

In accordance with the invention it is also possible for the metal of the first PVD layer to be chromium or chromium oxide and for the metal of the second PVD layer to be likewise chromium or chromium oxide, with the respective fractions of chromium oxide or elemental chromium in the first and second PVD layers being preferably different from one another.

In accordance with the invention it is also possible for the metal of the first PVD layer to be titanium or titanium oxide and for the metal of the second PVD layer to be likewise titanium or titanium oxide, with the respective fractions of titanium oxide or elemental titanium in the first and second PVD layers being preferably different from one another.

The above combinations of metal or metal oxide in a PVD metallic effect pigment with two PVD layers are particularly preferred in accordance with the invention.

The amount of elemental metal in the first outer face of the PVD metallic effect pigment differs at least by 10 atom % from the amount of elemental metal in the second outer face, irrespective of whether the metals in the first PVD layer and in the second PVD layer are the same as or different from one another.

According to a further variant of the invention, the platelet-shaped PVD metallic effect pigment has three or more PVD layers arranged one above another, all of the PVD layers each comprising elemental metal with clusters of elemental metal and metal oxide, and the highest amount of elemental metal being present either in the first outer face or in the second outer face of the PVD metallic effect pigment, and the amount of elemental metal in the first outer face and in the second outer face of the PVD metallic effect pigment being different from one another and differing by at least 10 atom %.

In a three-layer or multilayer construction, an outer face of the PVD metallic effect pigment of the invention preferably has the highest amount of elemental metal.

It is essential that one outer face has an elemental metal content which is at least 10 atom % higher than the amount of elemental metal in the second outer face.

The third, fourth, fifth, etc. PVD layers between the two outer PVD layers which contain the outer faces may certainly have an elemental metal content which is lower or higher than the amount of elemental metal in the outer face, the amount of which is at least 10 atom % below the amount of elemental metal in the other outer face with the highest amount of elemental metal.

The amount of elemental metal in the PVD interlayers between the PVD layers which contain the outer faces may therefore fluctuate in level, it being preferred for the highest amount of elemental metal to be present in one of the two outer faces.

In accordance with the invention it is preferred for the amount of elemental metal in the at least one PVD layer to change continuously, preferably at least partly with a gradient of 0.1 to 4 atom %/nm of PVD layer thickness, over the thickness of the PVD layer.

By a continuous increase in the amount of elemental metal is meant that the amount of elemental metal does not change suddenly, but instead alters in a curvelike or more closely linear manner over the thickness of the PVD layer. According to one preferred variant, the change in the amount of elemental metal is approximately linear, with the gradient of the change, i.e., increase or decrease in the amount of elemental metal, being situated in a range from 0.1 to 4 atom %/nm of thickness, more preferably in a range from 0.2 to 2 atom %/nm of thickness, more preferably still in a range from 0.4 to 1.5 atom %/nm of thickness.

The amount of elemental metal, oxidized metal, and oxygen may be determined by means of ESCA (electron spectroscopy for chemical analysis). The amount of elemental metal, oxidized metal, and oxygen determined by means of ESCA is generally an averaging over about 20 nm of thickness of the PVD layer. The measurement values in atom % carry an accuracy of ±1 atom %.

The thickness of the PVD metallic effect pigment can be determined by SEM (scanning electron microscopy).

According to a further variant of the invention, the amount of elemental metal changes discontinuously between two successive PVD layers.

Where two or more successive PVD layers are arranged, there is often a sudden change in the amount of elemental metal. Accordingly, the amount may change between two PVD layers arranged one atop the other, irrespective of whether the elemental metals are the same as or different from one another, by a number of atom %, as for example more than 5 atom % or more than 10 atom % or more than 15 atom %, over a thickness of 1 to 10 nm, with a significant change in the gradient of the change in the amount of elemental metal.

According to a further variant of the invention, the amount of elemental metal in the first outer face of the metallic pigment is in a range from 0 to 60 atom % and the amount of elemental metal in the second outer face of the metallic pigment is preferably in a range from 30 to 95 atom %, with the proviso that the difference in the amount of elemental metal between the first and second outer faces of the PVD metallic effect pigment is at least 10 atom %.

If the amount of elemental metal in one outer face is, for example, 50 atom %, then the amount of elemental metal in the second outer face is less than 40 atom % or at least 60 atom %. Where, for example, the amount of elemental metal in one outer face, on the other hand, is 20 atom %, for example, the amount of elemental metal in the second outer face is at least 30 atom %.

Preferably, the amount of elemental metal in the outer face having the higher elemental metal content is at least 40 atom %, preferably at least 45 atom %, more preferably at least 50 atom %, even more preferably at least 55 atom %, or at least 60 atom %. Also having proven very suitable are amounts of elemental metal in the range from 65 to 95 atom % or from 70 to 90 atom %.

In accordance with the invention it is preferred for the metals of the at least two PVD layers arranged one above another to be identical or different and preferably to be selected from the group consisting of aluminum, magnesium, chromium, silver, copper, gold, zinc, tin, manganese, iron, cobalt, nickel, titanium, tantalum, molybdenum, mixtures thereof, and alloys thereof.

Aluminum, chromium, titanium, and alloys thereof have proven very preferred metals.

It is preferred, furthermore, for the thickness of the PVD layer or layers to be in a range from 10 to 500 nm, preferably in a range from 20 nm to 280 nm. The thickness of the PVD layer or layers may also be in a range from 30 to 170 nm, more preferably in a range from 50 to 110 nm, more preferably still from 60 to 90 nm.

In one preferred variant, in the case of a PVD metallic effect pigment having two, three or more PVD layers, the PVD layer having the highest elemental metal content has a layer thickness in the range from 10 to 40 nm, more preferably in the range from 15 to 35 nm, even more preferably in the range from 20 to 30 nm. In particular, when the layer thickness is in the range from 10 to 40 nm, preferably in the range from 15 to 30 nm, this PVD layer absorbs incident light, and so the PVD metallic effect pigments of the invention appear strongly dark. At these layer thicknesses, the PVD layer has strongly absorbing properties.

Where the layer thickness of the PVD layer having the highest elemental metal content is above 40 nm, as for example in a range from 50 to 500 nm, in a range from 80 to 280 nm or in a range from 100 to 170 nm, this PVD layer has a more strongly reflecting effect.

It is preferred in accordance with the invention for the elemental metal to be present at least partly in the form of clusters, the clusters preferably having an average particle size from a range from 1 nm to 10 nm. Furthermore, preferably, the clusters of elemental metal have a particle size in the range from 1.5 to 8 nm, preferably in the range from 2 to 6 nm.

The clusters of elemental metal here are embedded in a continuous layer of metal oxide, the metal of the elemental metal being the same as that of the metal oxide. Accordingly, preferably, the clusters of elemental metal are present in the outer face of the PVD layer which has a lower elemental metal content.

In the case of a PVD metallic effect pigment of the invention with only one PVD layer, the elemental metal is present on one outer face preferably in cluster form and embedded in metal oxide. On the second outer face, having the higher elemental metal content, the elemental metal may also be present in cluster form.

In accordance with the invention, the platelet-shaped PVD metallic effect pigment may be enveloped with an anticorrosion layer which is optionally surface-modified.

The anticorrosion layer may not necessarily have been applied envelopingly. Particularly if the anticorrosion layer is applied likewise by PVD, there is no enveloping anticorrosion layer present, because the edges are not covered. In order to protect the edges as well of the PVD metallic effect pigments of the invention from corrosive influences, the anticorrosion layer is preferably applied envelopingly. An enveloping anticorrosion layer may be applied, for example, by wet-chemical coating or by coating in a fluidized bed.

The PVD metallic effect pigment surfaces may have been provided, furthermore, with organically modified phosphoric acids and/or phosphonic acids and/or derivatives thereof. Furthermore, the pigment surfaces may be provided with vanadium compounds and/or molybdenum compounds and also with a combination thereof. Additionally, the pigments of the invention may be coated with organic polymers and/or metal oxides. The metal oxides include preferably $SiO_2$, boron oxides, aluminum oxides, molybdates, and vanadates, and include their hydroxides and oxide hydrates or mixtures thereof.

In one particularly preferred embodiment, the preferably enveloping anticorrosion layer comprises $SiO_2$ or consists of $SiO_2$. With particular preference, the $SiO_2$ layer is applied envelopingly to the effect pigment by sol-gel methods. In this case it is preferred to use tetraalkoxysilanes, such as tetramethoxysilane or tetraethoxysilane, for example.

In other preferred embodiments, the PVD metallic effect pigments of the invention that are provided with an anticorrosion layer may also, additionally, have organic-chemical surface modifications, such as with silanes, titanates or aluminates, for example. The effect of the organic-chemical surface modifications may be compatibilization with the surrounding application medium, such as the binder system of a paint or of an ink, for example. Such organic-chemical aftercoating may, for example, allow chemical attachment to binders of paints or inks, thereby permitting covalent attachment of the PVD metallic effect pigments of the invention. Covalent attachment of the PVD metallic effect pigments to the binder system increases the condensation resistance and mechanical resistance of the coating medium, such as of inks and paints, for example, after curing.

Organic-chemical surface modification may be accomplished in this case by means of one or more organofunctional silanes, aluminates, zirconates and/or titanates, as disclosed in DE 10 2006 009 130 A1, or from at least one organic, phosphorus-containing compound, as disclosed in DE 10 2005 037 612 A1. The contents of DE 10 2006 009 130 A1 and of DE 10 2005 037 612 A1 are hereby incorporated by reference.

Very advantageously indeed, metal-oxidic coatings, preferably comprising or consisting of silicon oxide, also stabilize the ductile PVD metallic effect pigments against mechanical influences. Hence the mechanical stability of the PVD metallic effect pigments is increased to an extent such that the PVD metallic effect pigments of the invention can be incorporated into an application medium, such as, for example, polymers, binders, etc., even with relatively severe mechanical stressing, such as by means of extrusion, for example.

Therefore, the PVD metallic effect pigments of the invention may also be incorporated by means of extrusion into binders for preparing a powder coating material, the PVD metallic effect pigments being destroyed or damaged to far less of an extent than is the case with uncoated PVD metallic effect pigments or with PVD metallic effect pigments coated with purely organic protective layers.

The layer thicknesses of the metal oxide layers, more particularly of the protecting silicon oxide, aluminum oxide and/or inorganic/organic hybrid layers, are situated in the range from preferably 5 to 60 nm and more preferably from 10 to 50 nm.

According to one preferred variant, especially when using the PVD metallic effect pigments of the invention in a powder coating material, the metal oxide surface, preferably silicon oxide surface, is organic-chemically modified. The metal oxide surface in this case is modified preferably with at least one organic silane, which preferably, following application to the metal oxide surface, still has at least one reactive organic group and allows chemical attachment to the application medium, more particularly to the binder.

The PVD metallic effect pigments of the invention find use preferably in powder coating materials having a PVD metallic effect pigment content of 0.1% to 20%, preferably of 0.2% to 10%, more preferably of 0.5% to 6%, by weight, based on the overall powder coating material weight.

The platelet-shaped PVD metallic effect pigments of the invention are provided preferably in a nondusting or low-dust presentation form, in the form, for example, of granules, pellets, briquettes, chips, small sausages or tablets.

In the respective presentation form, the residual moisture content has a value from a range from preferably 0% to 15%, more preferably from a range from 0.05% to 10%, even more preferably from a range from 1% to 5%, by weight, of water and/or organic solvent or solvent mixture, based in each case on the total weight of the PVD metallic effect pigment preparation.

Especially in the case of granules, which do not have a compact, regular shape, the residual moisture content may be situated in the higher range, as for example in a range from 5% to 15% and preferably in a range from 6% to 10%, by weight, based in each case on the total weight of the granules.

In the case of the regularly shaped commercial forms of pellets, briquettes, chips, small sausages or tablets, preference is given to lower residual moisture contents from a range from 0% to 10%, more preferably from a range from 0.05% to 3%, and very preferably from a range from 0.1% to 1%, by weight, based in each case on the total weight of the PVD metallic effect pigment preparation.

In the case of aqueous applications in particular it is preferred for the amount of organic solvents in the PVD metallic effect pigment preparation of the invention to be below 2%, preferably below 1%, and more preferably below 0.5%, by weight, in order to minimize the VOC and/or odor loading.

According to one further preferred presentation form, the PVD metallic effect pigments of the invention are present as a dispersion in solvent or as a paste.

The object on which the invention is based is also achieved through the use of the platelet-shaped PVD metallic effect pigments of any of claims 1 to 11 in coatings, paints, automobile finishes, powder coating materials, printing inks, conductive coating formulations, digital-printing inks, plastics or cosmetic formulations.

The object of the invention is also achieved through provision of a coating composition which comprises platelet-shaped PVD metallic effect pigments of any of claims 1 to 11.

The coating composition is selected preferably from the group consisting of coatings, paints, automobile finishes, powder coating materials, printing inks, digital-printing inks, plastics, and cosmetic formulations.

The object of the invention is also achieved through provision of an article provided with platelet-shaped PVD metallic effect pigments of any of claims 1 to 11 or with a coating composition of claim 13 or 14.

The article may comprise coated films, more particularly greenhouse films, paper, cardboard, textiles, furniture, facade elements, plastics elements, automobile bodies, etc.

The object on which the invention is based is further achieved through provision of a method for producing a platelet-shaped PVD metallic effect pigment, the method comprising the following steps:

(a) coating a linearly moving substrate in a vacuum chamber having a vapor deposition section, by means of reactive physical vapor deposition (PVD), with at least one metal in the presence of oxygen, so that part of the metal reacts with oxygen to form metal oxide, and unreacted metal and metal oxide formed are deposited in asymmetric distribution over the vapor deposition section in relation to the movement direction of the linearly moving substrate, to give a PVD layer or a plurality of PVD layers arranged one above another, (b) detaching the applied PVD layer or layers, (c) comminuting the detached PVD layer or layers, (d) optionally converting the comminuted PVD layer or layers into a dispersion or paste.

According to one preferred embodiment of the invention, in step (a) the coating of a linearly moving substrate in a vacuum chamber by means of physical vapor deposition (PVD) takes place with at least one metal in the presence of oxygen, the oxygen being introduced into the vacuum chamber in asymmetric distribution in quantitative and/or spatial terms in relation to the movement direction of the substrate and in relation to the metal vapor source or sources, to give a PVD layer or two or more PVD layers arranged one above another.

According to a further variant of the invention, in step (a) the oxygen is introduced via an addition means largely centrally into the metal vapor given off from at least one metal vapor source, there being provided, between the linearly moving substrate on the one hand and the metal vapor source and also the addition means for oxygen, on the other hand, one or more shutters which limit the vapor deposition section and form a shutter aperture, the shutter aperture being arranged asymmetrically in relation to the metal vapor source or sources and also to the one or more addition means for oxygen.

According to a further variant of the present invention, the object is also achieved by a method for the preliminary checking of an asymmetry which is to be brought about in a PVD layer in terms of the different amounts of elemental metal in the first and second outer faces, said method comprising the following step: Coating a circulating or moving, linearly moving substrate or belt in a one-stage process in a vacuum chamber in a vapor-coating zone which has a width $b_B$ and a length $l_B$, in the presence of at least one oxygen-donating source, with at least one metal $M_A$ from at least one vaporizer source $VQ_A$, producing a mass coverage $m_{mA1}$ (mass 1 of metal A) and $m_{o1}$ (mass of oxygen to metal A1) with a resultant transmittance T1 in a first subsector of the substrate or belt with the length $\Delta l_{B1}$, and then a mass coverage $m_{MA2}$ (mass 2 of metal A) and $m_{o2}$ (mass of oxygen to metal A2) with a resultant transmittance T2 in a second subsector of the substrate or of the belt with the length $\Delta l_{B2}$, on the belt, the first subsector and the second subsector not overlapping, and where T1 and T2 have value, independently of one another, of between 0% and 95% and also a difference $\Delta T$ of 5% to 90%, and where the mass coverage of metal M and of oxygen over the width of the circulating or moving substrate or belt is largely constant.

The transmittance can be measured in a conventional way.

As a result of this method, PVD layers are produced, lying separately from one another or alongside one another on the substrate or belt, which correspond to the first—for example, lower—and, respectively, to the second—for example, upper—outer face of a PVD metallic effect pigment that is to be produced. Transmittance measurements can then be carried out on these spatially separate lower and upper faces. The results thus obtained allow a preliminary check on the asymmetry that is to be brought about in the PVD metallic effect pigment to be produced, or in the PVD layer, between lower or first and upper or second outer face, in terms of the different transmittances.

The above observations relating to the metallic effect pigments of the invention apply correspondingly to the method of the invention.

In the method of the invention there is a reaction of a portion of vaporized metal with infed oxygen to form metal oxide. In the method of the invention it is essential that unreacted elemental metal, and metal oxide formed from oxygen and metal, are deposited asymmetrically on the linearly moving substrate, to give an asymmetrically constructed PVD layer.

In accordance with a first variant, asymmetric deposition of elemental metal and metal oxide can be achieved by introducing metal vapor and oxygen into the PVD apparatus asymmetrically in terms of quantity and/or space.

In the context of a spatially and/or symmetrical introduction of metal vapor and oxygen into the PVD apparatus, asymmetric deposition on the linearly moving substrate may be achieved, in accordance with a second variant, by arranging shutters between the linearly moving substrate and the metal vapor source and also the addition means for oxygen, the shutters being arranged asymmetrically in relation to the metal vapor source or sources and also to the one or more addition means for oxygen.

The linearly moving substrate is preferably a belt, which may also take the form of a circulating belt. The belt may be a metal strip or a film made of plastic. In the case of a metal strip, a stainless steel strip, preferably a polished stainless steel strip, has proven suitable. In the case of a plastics belt, the belt may be made, for example, of polyethylene terephthalate, another polyester or else polyacrylate. In accordance with one preferred embodiment, the linearly moving substrate is provided with a release coat, which facilitates or, indeed, enables the removal or detachment of the vapor-applied PVD layer.

As a release coat it is possible to use a water-soluble salt or a film-forming material which is soluble in solvent, such as, for example, acetone, ethyl acetate, etc.

The metal applied to the linearly moving substrate, such as a single metal or a metal alloy, for example, is applied by vapor deposition from a metal vaporizer source, also referred to as metal source. The metal source may comprise heated crucibles or resistance-heated vaporizer boats containing the metal to be vaporized. The vaporizing of the metals may also be brought about by means of electron-beam vaporizers.

Relative to the direction of the linear movement of the linearly moving substrate, the oxygen, in accordance with the first variant of the method of the invention, may be supplied ahead of and/or after the metal vaporizer.

In accordance with one preferred embodiment of the invention, in the context of the first variant of the method of the invention, the oxygen, based on the direction of linear movement, is arranged after the metal vaporizer. Accordingly, the linearly moving substrate is guided first through the metal vapor cone and then through the oxygen cone. As a result of the superimposition of the metal vapor cone and of the oxygen cone, initially metal and then, increasingly, metal oxide as well are deposited on the linearly moving substrate. The metal oxide is formed by reaction of metal vapor and oxygen prior to deposition on the substrate. In the method of the invention, therefore, there is a reactive vaporization.

With this variant of the method of the invention, as a result of the superimposition of metal vapor cone and oxygen cone, there is a reduction in the fraction of elemental metal in the direction of linear movement of the linearly moving substrate, and hence an increasing inclusion of clusters of elemental metal in metal oxide. Ultimately, then, essentially metal oxide and, to a smaller extent, elemental metal are deposited as metal clusters. The resulting one (number: 1) PVD layer is therefore asymmetric in terms of the amount of clusters of elemental metal.

In relation to the linear movement of the linearly moving substrate, in the first variant of the method of the invention, it is of course also possible for the oxygen source to be arranged first of all and then for the metal vapor source or metal vaporizer to be arranged. With this embodiment, the linearly moving substrate is guided first through the oxygen cone and then through the metal vapor cone. As a result of the superimposition of the two cones, there is initially deposition of metal oxide, into which, increasingly, elemental metal in the form of metal clusters is included. Ultimately, then, essentially metal and, to a smaller extent, metal oxide are deposited. The resulting one (number: 1) PVD layer is likewise asymmetric in terms of the amount of clusters of elemental metal.

The inventors have found that through asymmetric arrangement of metal vaporizer and oxygen source in relation to the direction of movement of the linearly moving substrate, it is possible, with surprising simplicity, to provide innovative PVD metallic effect pigments which have the properties identified above.

In accordance with a further embodiment in the case of the first variant of the method of the invention, an oxygen source is arranged both before and after the metal vaporizer, in relation to the linear movement of the linearly moving substrate, but the amount of oxygen supplied by each source is different. The amount of supplied oxygen ahead of or after the metal vapor source in this case may be greater or smaller.

With this embodiment of the first variant of the method of the invention, metal oxide with included clusters of elemental metal is present on both faces of the PVD layer, with the amount of clusters of elemental metal in the two outer faces being different.

If the oxygen source lying ahead of the metal vapor source in the direction of linear movement supplies a lower amount of oxygen, as compared with the oxygen source which lies after the metal vapor source, then first of all a greater fraction of elemental metal and a lower fraction of metal oxide are deposited, and then, increasingly, more elemental metal. Subsequently, the fraction of metal oxide increases, and the fraction of elemental metal included in the metal oxide goes down. In this way, it is possible to produce one (number: 1) PVD layer with a core which, in addition to any metal oxide present, consists predominantly of elemental metal and has outer faces which have different amounts of metal oxide and/or elemental metal, hence making the PVD layer asymmetric. Also possible, of course, is an inverted arrangement, in which the first oxygen source supplies a greater amount of oxygen than the second oxygen source, based on the linear movement of the linearly moving substrate.

In accordance with the second variant of the method of the invention, metal vapor and oxygen are introduced symmetrically or largely symmetrically relative to the linearly moving substrate. Through arrangement of shutters which screen off part of the largely symmetrically introduced metal vapor and also of the oxygen from the linearly moving substrate, the substrate is vapor-coated asymmetrically with elemental metal and metal oxide in the direction of movement of the linearly moving substrate. The shutters are preferably arranged such that only about half of the vaporization cone of the metal vapor and of the oxygen cone reaches the linearly moving substrate, where it is deposited in the form of elemental metal and metal oxide.

With the second variant of the method of the invention, the aperture angles of metal vapor cone and oxygen cone are preferably set differently. In accordance with one preferred embodiment of this second variant of the method of the invention, the aperture angle of the oxygen cone is smaller than the aperture angle of the metal vapor cone.

The aperture angle of the oxygen cone may be set for example via the design of the geometry of the opening of the oxygen addition means. The aperture angle of the metal vapor cone may likewise be set via the geometry of the opening of the metal vaporizer.

Given identical geometry for the openings of oxygen addition means and metal vaporizer, it is also possible, with the second variant of the method of the invention, to achieve an asymmetry by means of a difference in the distances of metal vaporizer and of oxygen addition means from the linearly moving substrate. The metal vaporizer is preferably arranged at a greater distance from the substrate than is the oxygen addition means. With this embodiment of the second variant of the method of the invention, therefore, the oxygen is introduced largely centrally, preferably centrally, into the metal vapor cone which has already been formed.

It has emerged, surprisingly, that in the case of an asymmetric vapor-coating procedure with metal and oxygen, the linearly moving substrate can have a linear speed of up to 1000 m/min. According to one preferred development, the linear speed is at least 10 m/min, preferably at least 60 m/min, more preferably at least 120 m/min. Having proven very suitable are linear speeds from a range from 200 m/min to 950 m/min, more preferably from a range from 450 m/min to 850 m/min, even more preferably from a range from 620 m/min to 780 m/min.

The method of the invention is simple in process engineering terms, since the inhomogeneity or asymmetry of the resultant PVD metallic effect pigment is desired and therefore there is no need to take any costly and inconvenient precautions in order to obtain a homogeneous PVD layer.

As oxygen source it is possible to use oxygen-donating compounds and/or water-donating compounds and/or water. "Oxygen" for the purposes of the invention also includes oxygen atoms, compounds containing oxygen atoms, such as OH radicals or water, for example, and of course molecular oxygen.

According to one preferred embodiment, molecular oxygen ($O_2$) is used. According to another preferred embodiment, water and/or air is/are used.

If the PVD metallic effect pigment of the invention is to have more than one (number: 1) PVD layer, it is possible, for example, to arrange two or more PVD coating apparatuses one after another and to provide the linearly moving substrate, correspondingly, with two or more PVD layers, with each PVD layer, as elucidated above, being of asymmetric form. An alternative possibility also is to wind back the linearly moving substrate and to coat it again in the same PVD coating apparatus, with each PVD layer, as elucidated above, being of asymmetric form.

The second, third, fourth, fifth, etc. PVD layer in this case may be applied using different metals and/or metal oxides. Each PVD layer may of course also be formed using the same metal, with only the proportion of oxygen being changed from PVD layer to PVD layer, so that the proportion of elemental metal and metal oxide changes from PVD layer to PVD layer, with each PVD layer, as elucidated above, being asymmetric in form.

Over the width of the linearly moving substrate there may be two or more metal vapor sources and/or two or more oxygen sources arranged, with the longitudinal axis of these sources, formed by the middle points of the respective sources, being arranged preferably transverse with respect to the direction of movement. Hence the metal vapor sources and also the oxygen sources are arranged flush with one another and at right angles to the direction of movement of the linearly moving substrate, and so, over the cross section of the linearly moving substrate, the respective concentration of elemental metal and/or metal oxide is constant.

According to one preferred development of the invention, the width of the linearly moving substrate is in a range from 0.1 to 5 m, preferably in a range from 0.5 to 4 m, more preferably in a range from 1 m to 3 m.

According to the present invention, the vaporizer sources have resistance heating and/or are operated by means of electron-beam vaporization.

In the vacuum chamber there is preferably a pressure in the range from $10^{-4}$ bar to $10^{-1}$ bar prevailing.

Where molecular oxygen is used as the oxygen source, the flow rate in the case of a belt coating width of half a meter is situated preferably in a range from 1 to 15 slm, more preferably from 2 to 10 slm (slm: standard liters per minute).

Greater conversion of metal and oxygen, i.e., formation of metal oxide, is achieved through denser arrangement of the oxygen source on or in the metal vapor cone.

According to one preferred development of the method of the invention, the linearly moving substrate used in step (a) is provided with a metal layer applied preferably by means of physical vapor deposition (PVD), or is a metal foil.

According to one preferred embodiment, a precoated substrate is used as linearly moving substrate.

According to one embodiment in accordance with the invention, a metalized substrate is used as substrate that preferably has a release coat between substrate surface and metal layer. The system in question may be, for example, a plastics belt which has a release coat and subsequently an aluminum layer, chromium layer or titanium layer. This metal layer is preferably also applied by means of PVD. This metal layer naturally already has a small fraction of corresponding metal oxide.

Alternatively, a metal foil may be used as linearly moving substrate. As a metal foil it is possible for example to use a foil metalized with aluminum that is already available commercially. In this aluminum-metalized foil, the average thickness of the aluminum layer is situated preferably in a range from 10 to 50 nm and more preferably in a range from 20 to 40 nm.

Atop this precoated, metalized, linearly moving substrate or atop the metal foil, it is then possible to apply an asymmetric PVD layer or two, three, four, five, etc. asymmetric PVD layers, as described above, to give an asymmetric PVD metallic effect pigment.

The detachment of the PVD layer or layers in step (b) may be accomplished by passing the coated, linearly moving substrate through a solvent or a solvent mixture. Detachment may additionally take place by exposure to mechanical forces, with the substrate, for example, being passed over deflecting rolls, thus causing the film of metal to rupture and undergo detachment.

The comminuting of the detached fragments of the film of metal in step (c) may be accomplished by mechanical exposure, as for example by stirring and/or by irradiation of ultrasound, until the desired PVD metallic effect pigment size is reached.

Optionally, the solvent may then be separated off in step (d) and/or switched, to give a dispersion or paste with PVD metallic effect pigment of the invention.

Optionally, the resultant PVD metallic effect pigments may be provided with an anticorrosion layer. The anticorrosion layer is preferably applied wet-chemically or in a fluidized bed, envelopingly, to the PVD metallic effect pigments. Thereafter, an organic-chemical surface modification may be applied to the anticorrosion protection layer. In this context, reference is made to the observations above in relation to the PVD metallic effect pigments.

In a further step, the dispersion or the paste may then be converted into a compacted presentation form with metallic effect pigments which optionally have an anticorrosion layer, by means of compacting. By means, by way of example, of granulating, pelletizing, briquetting, tableting and/or extruding, the PVD metallic effect pigments may be converted into granules, pellets, briquettes, tablets or small sausages.

DESCRIPTION OF THE FIGURES

FIG. 4 shows the plan view of sequentially arranged longitudinal shutter apertures, which may be arranged additionally in the context of the arrangement shown in FIG. 3, and which allow the PVD layer to be subdivided into a "bottom" layer A1, "middle" layer A2, and a "top" layer A3. The lower shutter, which is opened over the entire width, then provides, in total, the "overall layer sequence" of the PVD layer of the PVD metallic effect pigment of the invention.

FIG. 6 shows the plan view of sequentially arranged longitudinal shutter apertures, which may be arranged additionally in the context of the arrangement shown in FIG. 5, and which allow the PVD layer to be subdivided into a "bottom" layer C3, "middle" layer C2, and a "top" layer C1. The lower shutter, which is opened over the entire width, then provides, in total, the "overall layer sequence" of the PVD layer of the PVD metallic effect pigment of the invention.

FIGS. 14a, 15a, 16a, 17a, 18a, 19a, and 20a represent concentration distributions, determined in each case by means of XPS/ESCA sputter profiles, for the elements carbon (C), oxygen (O), the total concentrations of Al (tot) and Cr (tot), and the associated concentration distributions of elemental metal Al(0) and Cr(0) for inventive examples 1 to 6 and for comparative example 8.

FIGS. 14b, 15b, 16b, 17b, 18b, 19b, and 20b represent in each case the ratio of elemental metal to oxidized metal in atom % over the layer thickness, these figures corresponding to FIGS. 14a, 15a, 16a, 17a, 18a, and 19a, respectively, but without the oxygen fraction.

EXAMPLES

In the text below, the production of the PVD metallic effect pigments of the invention is described with reference to examples, without imposing any restriction on the invention.

Part A: Production of the inventive PVD metallic effect pigments with reference to inventive examples 1-10 in relation to comparative examples 1-8 which illustrate the prior art.

Part B: Characterization of the structural composition of the inventive PVD metallic effect pigments of examples 1 and 1a, 1b, and 1c, and examples 4 and 4a, 4b, and 4c, on the basis of TEM measurements (transmitted light, diffraction).

Part C: Characterization of the structural composition of the inventive pigments on the basis of EDX measurements.

Part D: Characterization of the profile of oxygen and/or metal over the layer thickness from the top face A to the bottom face B on the basis of inventive examples 1, 2 and 3 (based on Al) and of inventive examples 4, 5, and 6 (based on Cr). A comparison with the prior art takes place on the basis of comparative example 8, which corresponds to example 1 of DE 10 2007 007 908 A1.

Part E: Colorimetric evaluation of the inventive PVD metallic effect pigments from the inventive examples in relation to PVD metallic effect pigments from comparative examples 1 to 8 (PVD metallic effect pigments with a largely homogeneous composition, without gradients).

Part A: Production of the Inventive PVD Metallic Effect Pigments as Per Inventive Examples 1-10

Step 1: Coating of the Carrier Film

Figure 1:
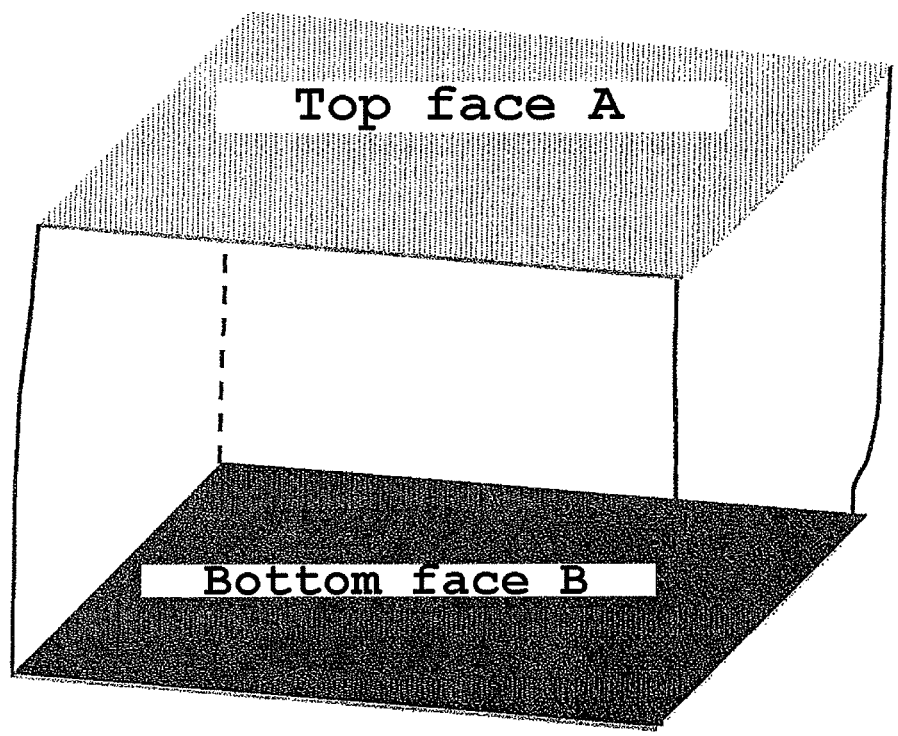
FIG. 1 shows the schematic construction of a multilayer PVD metallic effect pigment of the invention with one (number: 1) PVD layer, the amount of elemental metal in the top face A being greater than the amount of elemental metal in the bottom face B.
Figure 2:
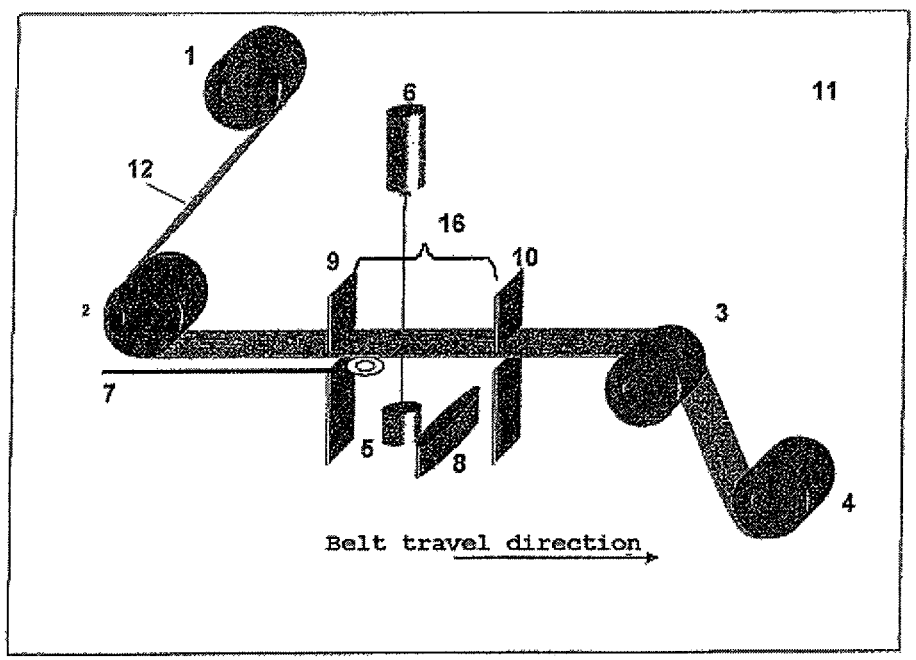
FIG. 2 describes the basic construction of a PVD apparatus in the form of a belt coating unit having a source roll 1, from which the linearly moving substrate (12) is unrolled. The substrate is then guided via the deflecting rolls (2) and (3) to the pickup roll (4). The transmittance measurement (5) and (6) and the oscillating quartz measurement (7) allow determination of the amount of deposited metal oxide and elemental metal. The shutters (9) and (10) separate the vapor-coating unit with vaporizer boat (8) (metal vaporizer) from the surroundings. The shutters (9) and (10) delimit the vapor deposition section (16), in which the linearly moving substrate is vapor-coated by means of PVD. The belt coating unit is located in a vacuum chamber (11).
Figure 7:
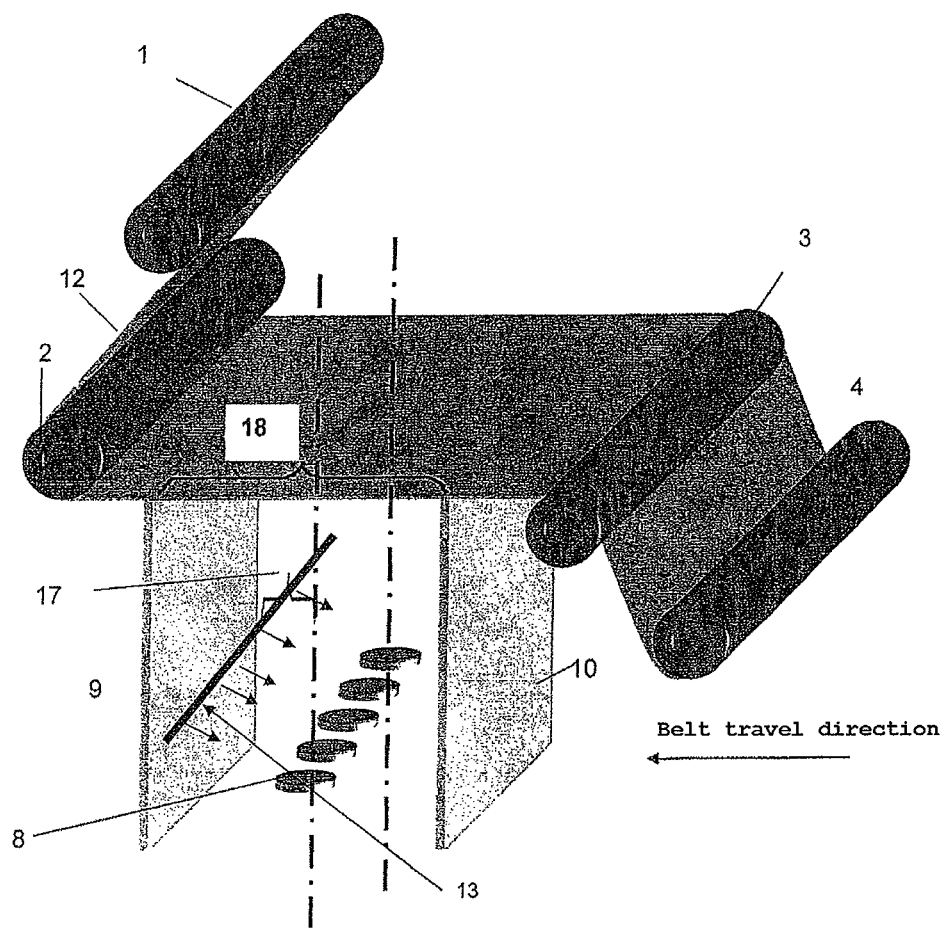
FIG. 7 shows the schematic arrangement of two or more vaporizer sources which are arranged flush over the width of the linearly moving substrate (12). The oxygen inlet (13) is represented by a parallel-arranged pipe with holes. The oxygen emerges from the holes, as indicated by little arrows. The schematic arrangement additionally shows the length L (18) of the shutter aperture delimited by the shutters (9) and (10). The shutters (9) and (10) define the vapor deposition section of the substrate. The horizontal distance between metal vaporizer and oxygen supply (13) is indicated with $\Delta l$ (17).
Figure 8:
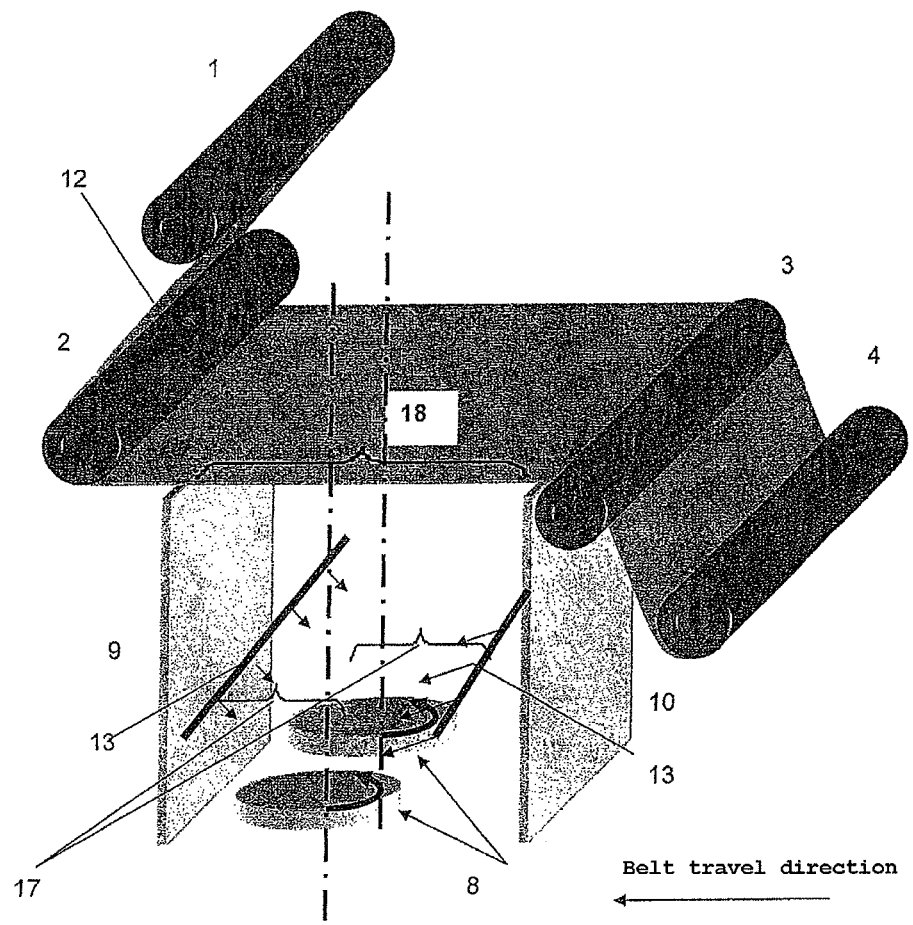
FIG. 8 shows, schematically, two rotary crucible vaporizers 8. By means of an electron beam, a line pattern is generated on the rotating vaporization material in the rotary crucible vaporizers (8), and the vaporization material is hence vaporized. From the holes in the oxygen supply lines (13), which are arranged ahead of and after the rotary crucible vaporizers (8) in relation to the linear movement of the substrate, oxygen emerges into the vacuum chamber, the different arrow lengths symbolizing gas flows of differing extents. The schematic arrangement additionally shows the length L of the shutter aperture (18) delimited by the shutters (9) and (10). The shutters (9) and (10) define the vapor deposition section of the substrate. The horizontal distance between the middle point of the rotary crucible vaporizers (8) and the middle point of the oxygen inlets (13) of the shutter aperture (18) is indicated by Δl (17) in each case.

The general production of the PVD metallic effect pigments as per inventive examples 1-10 took place in each case with different PVD belt units in accordance with the schematic FIGS. 2, 7, and 8.

Polyethylene terephthalate (PET) film with a thickness of 23 μm, coated with a release coat, was used as substrate. The release coat consisted of acetone-soluble methyl methacrylate resin and was applied conventionally beforehand in a separate workstep.

Vaporization techniques used were either the electron-beam vaporization technique or the resistance-heated vaporization technique.

Moreover, a distinction was made between a one-stage and a two-stage coating process.

The one-stage process describes the production of PVD metallic effect pigments in accordance with inventive examples with a single coating step.

The two-stage process describes the production of PVD metallic effect pigments in accordance with inventive examples by two successive, separate coating steps.

The layer thicknesses of the vapor-applied PVD metal layer were monitored via the mass coverage produced. The mass coverage produced is determined from the distance between substrate and metal vaporizer, the length L of the shutter aperture, the belt speed of the substrate, and the respective vaporization rate.

The gas flow required for the examples was supplied by means of a gas flow regulator (Mass Flow Controller) from the company MKS, Munich, Germany. The location of the oxygen supply in each case is shown schematically in FIGS. 3, 5, 7, and 8.

For inventive examples 1 to 3, mass coverage was determined conventionally using an oscillating quartz. In the case of inventive examples 4 to 6 and the comparative examples, the mass coverage was determined following detachment from the film, by weighing.

Step 2: Detachment from the Carrier Film and Comminution

Following physical vapor deposition, the individual PVD layers or PVD layer stacks in accordance with the respective examples of the carrier film were achieved by detachment with solvent from the release-coated substrate. In the resultant suspensions, residues of the release coat were separated with solvent from the detached PVD layers or PVD layer stacks, and washed, and the PVD layers or PVD layer stacks were subsequently comminuted to the desired particle size using a comminuting tool.

In accordance with a procedure described in Part E, color batches were prepared for colorimetric assessment of the inventive examples with comparative examples.

The respective method parameters for inventive examples 1-10 are recorded in table 1a.

TABLE 1a

Method parameters for examples 1-10

| Sample | Layer sections/vapor-applied component/ oxygen position | Chamber vacuum [1 * 10⁻⁴ mbar] | Mass Coverage [g * m⁻²] | Gas flow rate [slm] | (Horizontal) distance of metal vaporizer middle point to oxygen inlet middle point, Δl, based on the length L of the shutter aperture in [%] | Belt speed [m * min⁻¹] | Type of belt process |
|---|---|---|---|---|---|---|---|
| Inv. example 1 | Al; (oxide from right) | about 7.5-8 | 0.35 | 0.9 | 100 * 22/22 = 100 | 8 | one-stage |
| Inv. example 1a | Al from piece A2 | about 7.5-8 | | 0.9 | 100 * 22/7 = 314.3 | 8 | |
| Inv. example 1b | Al from piece A1 | about 7.5-8 | | 0.9 | 100 * 22/5 = 440 | 8 | |
| Inv. example 1c | Al from piece A3 | about 7.5-8 | | 0.9 | 100 * 22/10 = 220 | 8 | |
| Inv. example 2 | Al | | | | | | two-stage |
| | 2a from piece A1 (no oxygen supply) | 2.2 | 0.365 | 0 | | 8 | |
| | 2b from piece A2 + A3 (oxide from right) | 5.5 | | 0.9 | 100 * 22/17 = 129.4 | 4.3 | |
| Inv. example 3 | Al (oxide from left) | 10 | 0.33 | | 100 * 14/18 = 77.8 | 33 | one-stage |

The process parameters for the production of the PVD metallic effect pigments in accordance with comparative examples 1-8 are recorded in table 1b.

TABLE 1b

Process parameters for comparative examples 1-8

| Sample | Layer sequence/vapor-applied components | Chamber vacuum [1 * 10⁻⁴ mbar] | Mass coverage [g * m⁻²] | Gas flow rate [slm] | Type of belt process | Belt speed [m * min⁻¹] |
|---|---|---|---|---|---|---|
| Comp. example 1 | Cr | 3.0 | 0.2 | none* | one-stage | 0.5 |
| Comp. example 2 | Cr | 3.3 | 0.3 | none* | one-stage | 0.5 |
| Comp. example 3 | Cr | 2.77 | 0.37 | none* | one-stage | 0.5 |
| Comp. example 4 | Cr | 2.8 | 0.44 | none* | one-stage | 0.5 |
| Comp. example 5 | Cr | 3.0 | 0.51 | none* | one-stage | 0.5 |
| Comp. example 6 | Cr | 2.7 | 0.59 | none* | one-stage | 0.5 |
| Comp. example 7 | Cr | 2.8 | 0.65 | none* | one-stage | 0.5 |
| Comp. example 8 | Cr | 3.6 | 0.67 | none* | one-stage | 0.5 |

In comparative examples 1 to 8 there was no additional oxygen supply. Operation was carried out with a significantly poorer chamber vacuum than in the case of the inventive examples. The fraction of residual oxygen in the chamber was high enough to bring about reactive vaporization, i.e., the formation of metal oxide from oxygen present and from vaporized elemental metal.

The PVD metallic effect pigments of comparative examples 1 to 8 were producible only at low belt speeds of 0.5 m/min.

The belt speeds in the case of the production of the PVD metallic effect pigments in accordance with the inventive examples, in contrast, were substantially higher and were situated within a range from 4 to 60 m/min.

Figure 3:
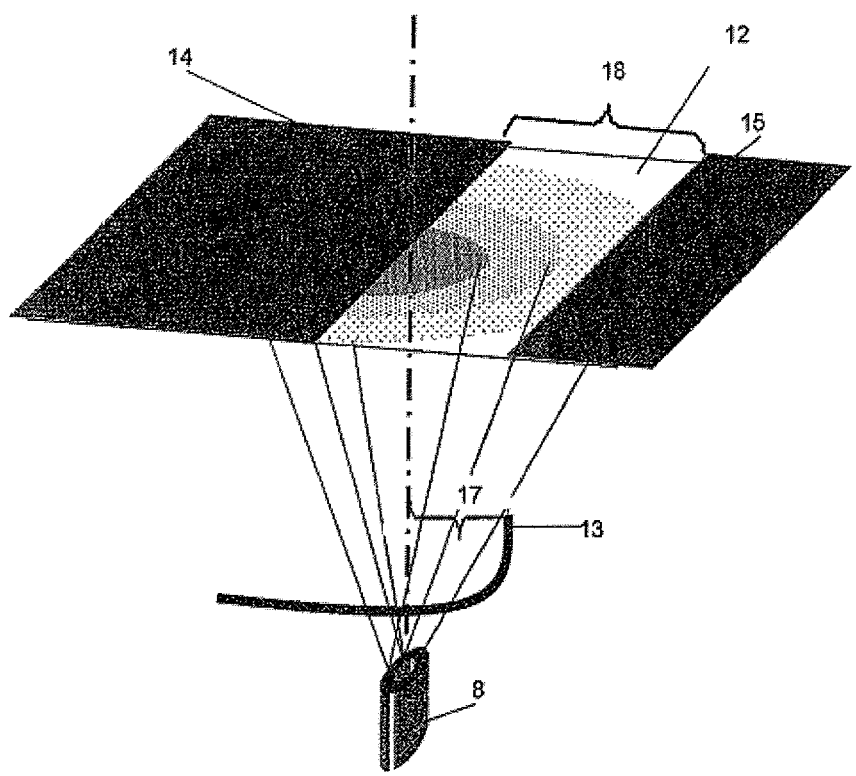
FIG. 3 shows the geometric arrangement of oxygen inlet (13), metal vaporizer (8), and shutters (14) and (15), with the length L of the shutter aperture (18). The shutter aperture delimited by the shutters (14) and (15) defines the vapor deposition section of the substrate. The shutters (14) and (15) are arranged between substrate and metal vaporizer (8) and oxygen inlet (13). The schematic arrangement also shows the length L of the shutter aperture (18) and the horizontal distance $\Delta l$ 17 between the middle point of the vaporizer and the middle point of the oxygen inlet.
Figure 5:
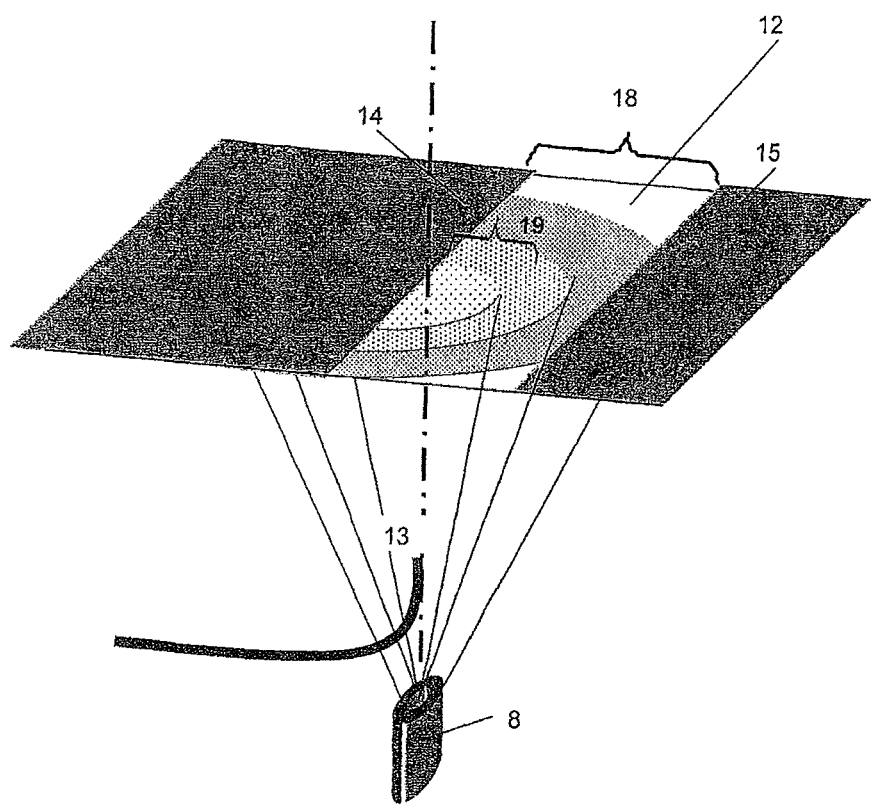
FIG. 5 shows the geometric arrangement of oxygen inlet, metal vaporizer (8), oxygen supply (13) and asymmetrically arranged shutters (14) and (15). The schematic arrangement also shows the length L (18) of the shutter aperture delimited by the shutters (14) and (15). The shutter aperture defines the vapor deposition section 18 of the substrate (12). The horizontal distance "y" defines the middle point of the vapor-coating length (18) between the middle point of the metal vaporizer (8) and the beginning of the shutter aperture (18). In this arrangement, the oxygen inlet (13) is located directly above the middle point of the metal vaporizer 8. $\Delta l$ (17) between evaporator middle point and oxygen inlet middle point in this case is therefore zero.

Production of the PVD Layers in Accordance with Inventive Examples 1, 3, 4 and 6, Using the One-Stage Belt Method:

In order to illustrate the asymmetric structural composition of the PVD layer of the PVD metallic effect pigments in accordance with the inventive examples in the one-stage vaporization process, the procedure adopted was as follows:

In order to be able to represent the construction of the PVD layer in accordance with inventive examples 1 and 4, coating took place with a PVD apparatus with arrangement of metal vaporizer, oxygen supply, and shutter arrangement, for example 1, as shown schematically in FIG. 3, and for example 4, as shown schematically in FIG. 5.

The division of the PVD layer into individual layer sections or pieces over the layer thickness took place by the arrangement of longitudinal shutter apertures over the vapor deposition section of the substrate, as shown in FIG. 4 in connection with the arrangement depicted in FIG. 3, and as shown in FIG. 6 in connection with the arrangement depicted in FIG. 5. In schematic FIGS. 4 and 6, the layer sections A2 (inventive ex. 1a), A1 (inventive ex. 1b), and A3 (inventive ex. 1c) for example 1, and the layer sections C2 (inventive ex. 4a), C3 (inventive ex. 4b), and C1 (inventive ex. 4c) for example 4, are shown, in each case in plan view.

The plan view shown in schematic FIG. 4 therefore shows, for example 1, the following coating sequence of the layer sections: A1 then A2 then A3 in belt direction.

Example 1a: second layer section A2 of the layer from example 1

Example 1b: first layer section A1 of the layer from example 1

Example 1c: third layer section A3 of the layer from example 1.

The oxygen content in the layer sections, referred to as pieces in table 1a, increases from A1 to A2 to A3. This is a result of the asymmetric arrangement of the shutter aperture of the vapor deposition section in relation to the oxygen supply and the metal vaporizer, as shown in FIG. 3. Offline transmittance measurements carried out subsequently have confirmed this result.

In the case of layer section A1, a transmittance of 32% was measured; in the case of layer section A2, a transmittance of 46%; and in the case of layer section A3, a transmittance of 86%. The greater the transmittance, the greater the fraction of transparent metal oxide.

The plan view shown in schematic FIG. 5 therefore shows, for example 4, the following coating sequence of the layer sections: C3 then C2 then C1 in belt direction.

Example 4a: second layer section C2 of the layer from example 4

Example 4b: first layer section C3 of the layer from example 4

Example 4c: third layer section C1 of the layer from example 4.

The oxygen content in the layer sections, referred to as pieces in table 1a, increases from C1 to C2 to C3. This is a result of the asymmetric arrangement of the shutter aperture and of the vapor deposition section in relation to the oxygen supply and the metal vaporizer, as shown in FIG. 5. Offline transmittance measurements carried out subsequently have confirmed this result.

In the case of layer section C1, a transmittance of 54% was measured; in the case of layer section C2, a transmittance of 77%; and in the case of layer section C3, a transmittance of 92%. The greater the transmittance, the greater the fraction of transparent metal oxide.

In the case of inventive example 3, a PVD arrangement of metal vaporizers and oxygen supply was used as shown schematically in FIG. 7. In inventive example 6, a PVD arrangement of metal vaporizers and oxygen supply was used as shown schematically in FIG. 8. With these PVD arrangements, further vaporizer sources were used, in each case transverse to the belt travel direction of the substrate, in order to achieve largely homogeneous deposition of the coating material over the width of the PET film (coating width approximately 50 cm).

Production of PVD Layers in Inventive Examples 2, 5, 7, 8, 9, and 10 by the Two-Stage Belt Method:

In order to show analytically the transition of two PVD layers between one-stage and two-stage belt methods by means of EDAX and XPS methodology, the PVD layers were produced for this purpose in accordance with inventive examples 2 and 5 by a two-stage belt method.

For producing the inventive PVD metallic effect pigments as per inventive example 2, first of all the shutter apertures for generating the layer sections A2 and A3 were covered in accordance with the plan view in FIG. 4, and the layer section A1 (example 2a) was generated by vapor deposition of aluminum. In this case, no gas was supplied, in order to produce a metallic layer. After this first coating of the substrate, the belt substrate was wound back and the shutter apertures were opened for the generation of layer sections A2 and A3, but the shutter aperture of layer section A1 was covered. The 2nd layer 2b was then vapor-applied with supply of oxygen, in accordance with the method parameters indicated in table 1a, in order to generate a PVD layer construction comprising a PVD metal layer and a PVD metal-metal oxide layer.

For producing the inventive PVD metallic effect pigments in accordance with inventive example 5, first of all the shutter apertures of layer sections C2 and C3 were covered, in accordance with the plan view in FIG. 6, and example 5a, comprising the layer section C1, was generated. In this case, no gas supply was used, in order to generate a metallic layer. After this first coating of the substrate, the belt substrate was wound back and the shutter apertures were opened in order to generate example 5b, comprising the layer sections C2 and C3, but the shutter aperture for generating the layer section C1 was covered. The 2nd layer 5b was then deposited more oxidically with supply of oxygen, in accordance with the method parameters indicated in table 1a.

For generating inventive example 7, a PVD arrangement was selected which corresponds to the schematic arrangement in FIG. 7. In contrast to inventive example 3, individual oxygen sources were respectively arranged very closely alongside the individual resistance-heated vaporization boats (metal vaporizers).

As a result of this arrangement of the oxygen supply, a very oxide-rich PVD aluminum layer (example 7b) was generated. In a second coating step, pieces of this oxide-rich PVD aluminum layer were coated with a second, very metallic aluminum layer, example 7b, in accordance with FIG. 2, without oxygen supply, using a resistance-heated PVD vaporization method.

In order to illustrate the independence of the coloredness from the layer thickness of the metallic aluminum layer, inventive examples 8, 9, and 10 were produced.

In this case, three aluminum base coatings, in accordance with FIG. 2, were generated by electron-beam vaporization methods. By varying the belt speed, three aluminum layers with different layer thicknesses were generated, as per 8a, 9a, and 10a. After the end of coating, the coated belt substrate was wound back and coating took place subsequently in each case with an oxidic Cr layer (examples 8b, 9b, and 10b), which produced an extensive blue coloration on the three Al layers of different layer thickness in the case of examples 8, 9, and 10.

The Cr layer of examples 8b, 9b, and 10b, which as an individual layer has a gold-brownish effect, therefore produced in each case the same blue coloration on the different aluminum layer thicknesses. This is a key advantage in that, in the case of the effect pigment, the coloration is dependent only on the layer thickness of the metallic chromium/chromium oxide layer. Consequently, substantially improved hue reproducibility is possible by comparison with effect pigments in which two layer thicknesses contribute to the color effect.

Part B: Clarification of the Structural Composition of the Inventive Pigments by Means of TEM (Electron Diffraction, Transmission)

Figure 9:
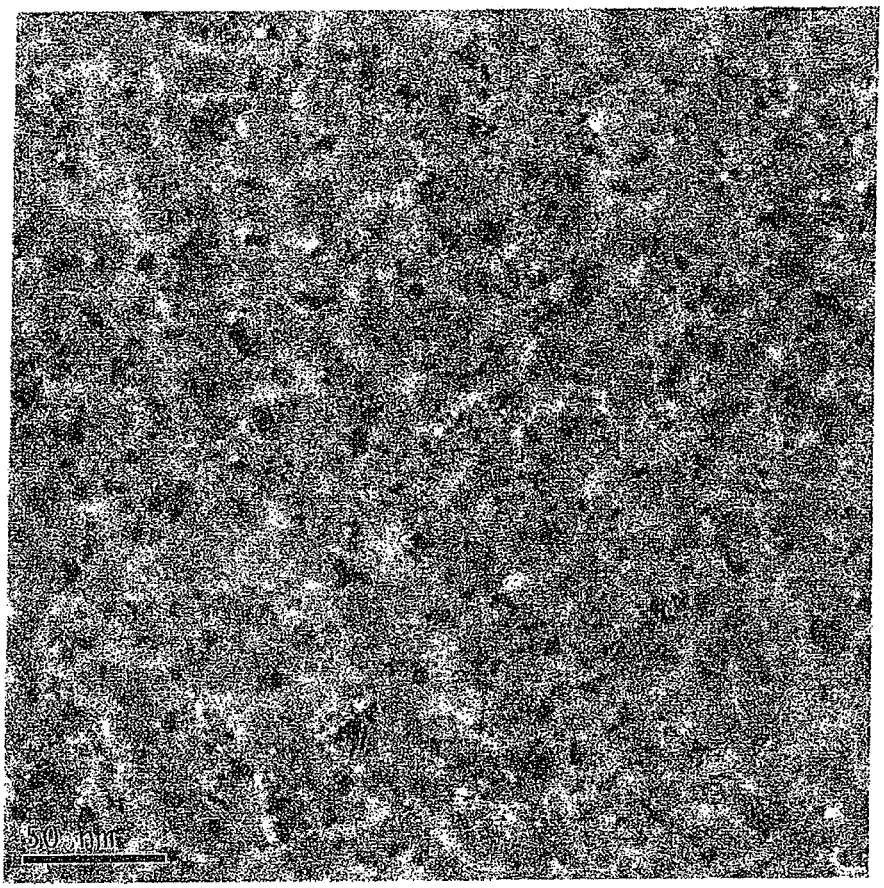
FIG. 9 shows a TEM image of the PVD layer from example 1a. The dark patches are metal clusters.

In order to resolve the structural composition of the inventive PVD metallic effect pigments, the layer sections of the PVD metallic effect pigments were investigated by means of transmission electron microscopy (TEM). The instrument used was a Zeiss 922 Omega (from Zeiss). It was equipped with an Ultrascan 1000 CCD detector (from Gatan). The imaging medium used was an electron beam, which illuminated the PVD metallic effect pigments and their layer sections uniformly and largely parallel. The acceleration voltage was 200 kV. The electrons were scattered at inhomogeneities in the sample and diffracted at lattice structures. After departing the layer, the electrons were focused through an electron optical system into the intermediate image plane, and after passing through a further magnification stage were imaged by means of an electronic CCD camera system. In this way, a real depiction of the illuminated layer was obtained. FIG. 9 shows, by way of example, the TEM image of the layer from inventive example 1a.

Figure 10:
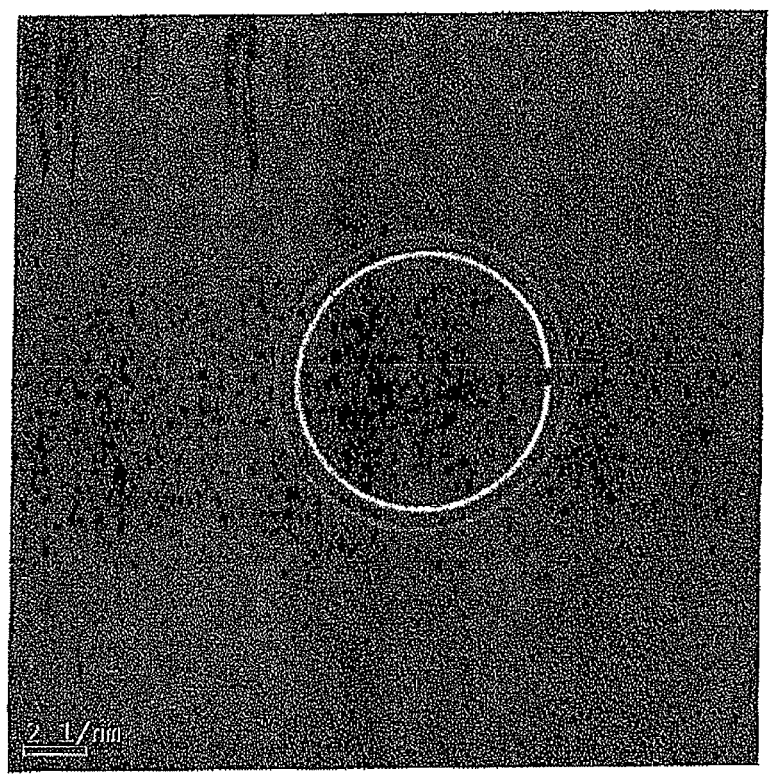
FIG. 10 shows the electron diffraction image associated with FIG. 9 of the PVD layer from example 1a. The diffraction reflections are arranged in concentric rings. The zero-order reflection is blanked out. The concentric rings show that the black patches from FIG. 9 are metal clusters.

As well as the real depiction, the electron diffraction image of the sample also provides important information on the nature of the layer. The diffraction image is obtained by imaging not the intermediate image plane but instead the diffraction plane with magnification. From the intensity and position of the diffraction reflections, clear structural statements can be made about the inner construction of the pigments. FIG. 10 shows, by way of example, an electron diffraction image of the layer from example 1a.

Figure 11:
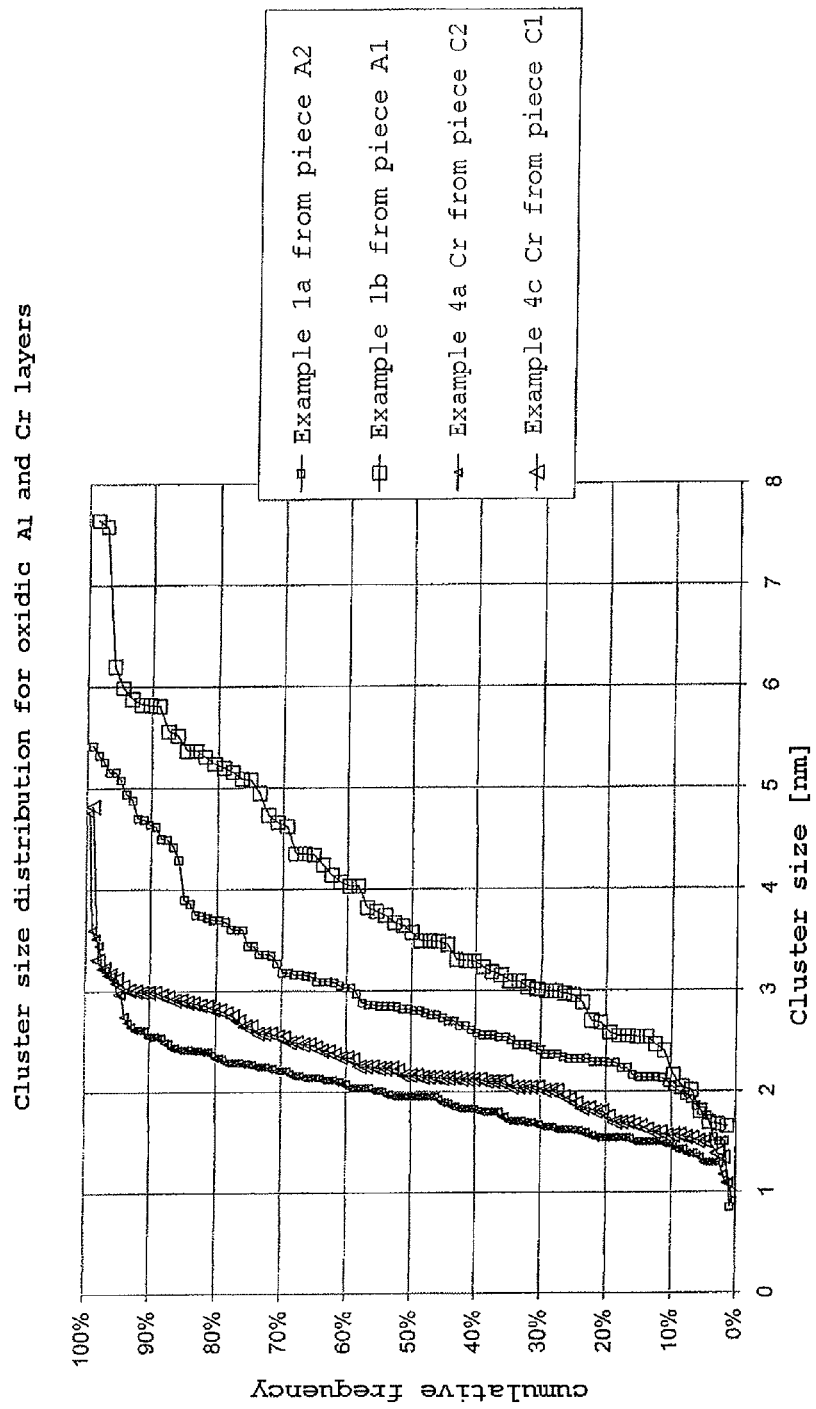
FIG. 11 shows the size distribution of the metal clusters in the PVD layers of inventive examples 1a, 1b, 4a, and 4c in the form of a graph. The plot is of cumulative frequency against cluster size.
Figure 12:
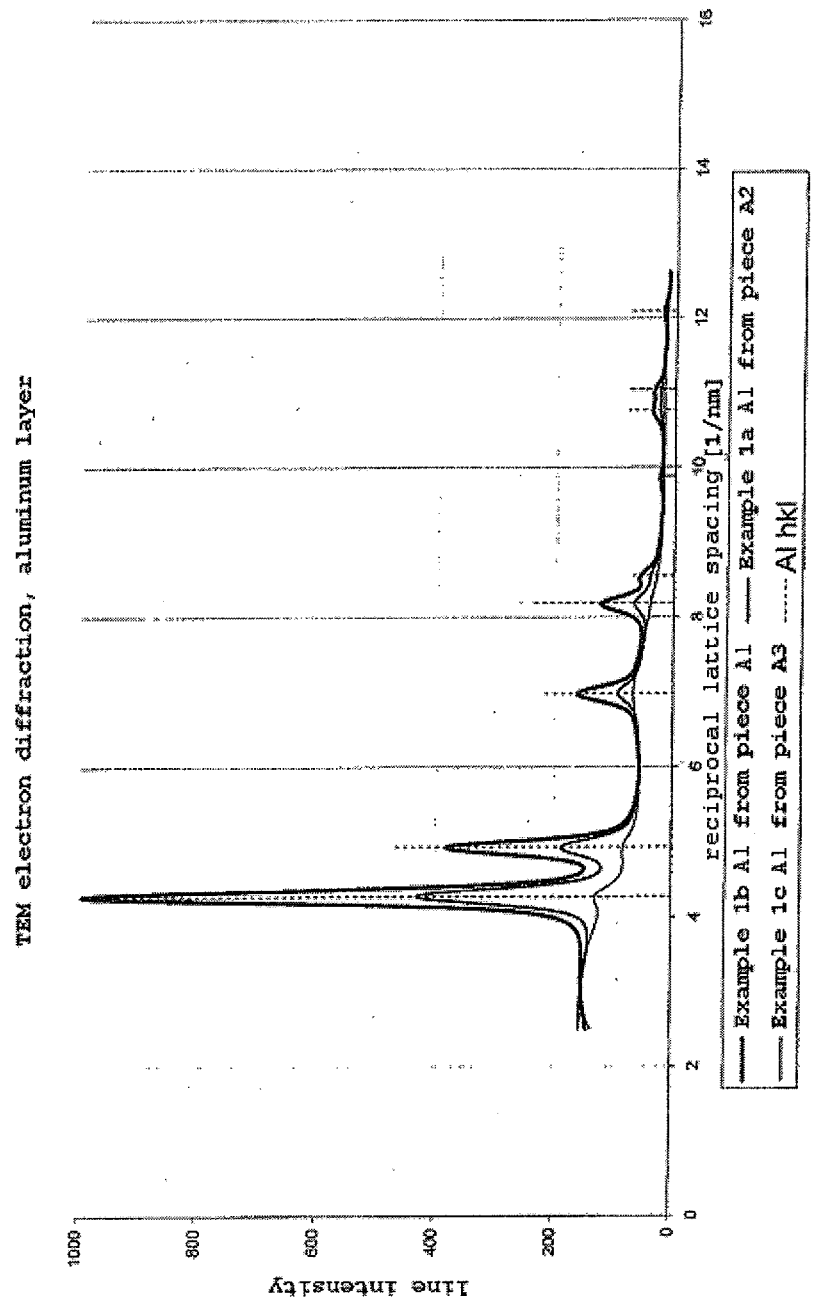
FIG. 12 represents the intensity distribution of the electron diffraction reflections of the oxidic aluminum layers from inventive examples 1a, 1b, and 1c. The plot is of reflection intensity against reciprocal lattice spacing.
Figure 13:
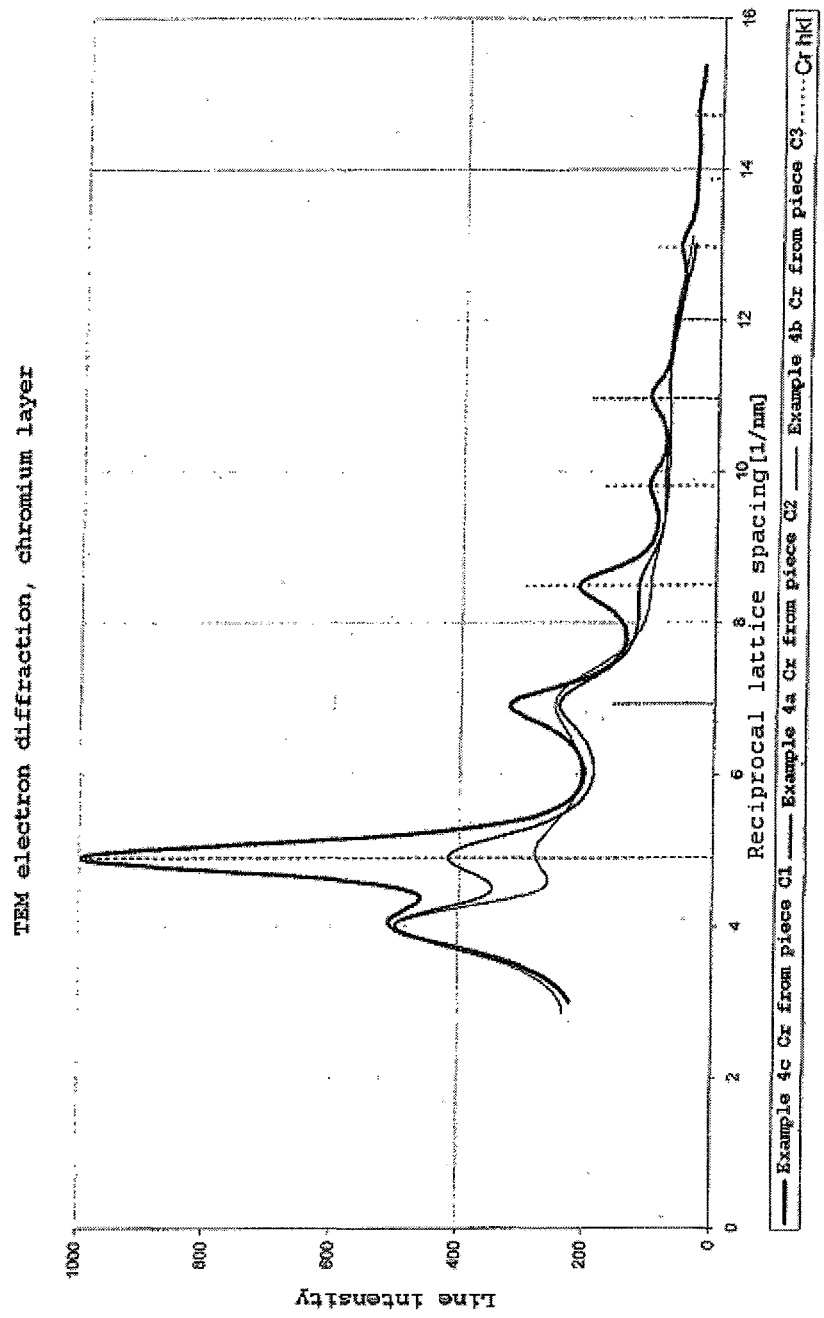
FIG. 13 represents the intensity distribution of the electron diffraction reflections of the oxidic chromium layers from inventive examples 4a, 4b, and 4c. The plot is of reflection intensity against reciprocal lattice spacing.

Of the inventive PVD metallic effect pigments of inventive examples 1a, 1b, 1c, and 4a, 4b, and 4c, real images and electron diffraction images were recorded by TEM. It was found that the material was not homogeneous, but instead consisted essentially of an oxidic matrix in which tiny metal clusters were embedded (see black patches in FIG. 9). In all PVD metallic effect pigments in accordance with the inventive examples, metal clusters were detectable, with a size of a few nanometers. For a more precise determination of the size of the metal clusters, their diameters were measured, in the case of the PVD layers in accordance with inventive examples 1a, 1b, 4a, and 4c, on in each case approximately 100 metal clusters, and a statistical size analysis was produced from these measurement values (FIG. 11). The sizes of the small clusters of samples 1c and 4b were such that they could not be measured with sufficient accuracy. The evaluation showed that the size of the metal clusters, but not their number, decreased as the oxide content went up. The size of the metal clusters was on average below 5 nm, with the aluminum clusters overall having a somewhat larger size than the chromium clusters.

Electron diffraction images were recorded for the pigments of examples 1a, 1b, 1c, 4a, 4b, and 4c. Since the images were present in electronic form as a result of the CCD camera system, it was possible to evaluate not only the position of the reflections but also their intensity distribution. It was found that the diffraction maxima fitted exactly, in terms of their position and intensity distribution, with the literature values for metallic aluminum and chromium, respectively. Accordingly, the existence of these metal clusters was reliably proven. The reflections were significantly broadened for all of the samples. This showed that the diffracting metal crystallites could only be a few nanometers in size. At the same time it was recognizable that the reflection intensities decreased as the oxide content went up, and became very small in the case of an approximately stoichiometric oxide content. This is in line with the fact that in this case there is no longer any active metal present. Apart from the metal cluster reflections, no further interference lines were found. In particular, there were no lines which would have fitted with the various crystal modifications of the metal oxides. There was, however, a continuously decreasing intensity background with broad maxima. This was the typical intensity distribution of amorphous solids. It can therefore be assumed that the oxides in these layers are present in amorphous form.

The layers of inventive examples 1a, 1b, 1c, 4a, 4b, and 4c therefore consist of substantially amorphous metal oxide with nanometer-size metal clusters embedded therein. The average size of these clusters falls as the oxide content goes up, and is typically below 5 nm.

Part C: Characterization by Means of SEM and EDX

Analytical oxygen determination by means of EDX measurements:

The oxygen and metal composition of the layers in accordance with inventive examples 1a, 1b, 1c, 4a, 4b, and 4c was determined using the above-described measurement methodology by means of EDX (instrument: EDAX Gemini; from EDEX Incorp., USA).

Sample Preparation:

The layers were dispersed in a solvent and comminuted. A few drops of the dispersion were applied to a sample plate, and the solvent was slowly evaporated at room temperature. The layers took up an orientation largely parallel to the plate surface.

Measurement:

The mean atomic ratio of oxygen to metal was determined for the layers of the inventive examples.

For this purpose, first of all, regions were looked for, using scanning electron micrographs, in which at least 4 to 5 individual separate PVD layers were superimposed on one another. Measurement was carried out at these locations. For the measurements on the aluminum/aluminum oxide layers, an acceleration voltage of 5 kV was selected; for the chromium/chromium oxide layers, a voltage of 8 kV was operated. This ensured that, for effective averaging, there were always two or more layers excited simultaneously, without measurement of the substrate background as well. Excitation took place in each case of, for oxygen, the K line (excitation energy: about 0.5 keV), for chromium, the K line (excitation energy: about 5.4 keV), and, for aluminum, the K line (excitation energy: about 1.5 keV). The excited X-ray spectrum was subjected to measurement, and the fraction of oxygen and metal, respectively, was determined from the peak height ratio with the aid of a software program.

The physical data for examples 7-10 and comparative examples 1-8 have been recorded in tables 2a and 2b.

TABLE 2a

Physical data for layer thicknesses and oxygen contents in relation to inventive examples 7 to 10

| Sample | | Layer or layer sequence of vaporized metal | | EDX | |
|---|---|---|---|---|---|
| Inventive example 7 | | Al | Al, high oxide content | Al | Al, high oxide content |
| | SEM layer thicknesses [nm] | 60 | 271 | | |
| | Oxygen $O_2$ [atom %] | | | 13 | 67 |
| Inventive example 8 | | 8a Al | 8b Cr, oxide-containing | 8a Al | 8b Cr, oxide-containing |

TABLE 2a-continued

Physical data for layer thicknesses and oxygen contents in relation to inventive examples 7 to 10

| Sample | | Layer or layer sequence of vaporized metal | | EDX | |
|---|---|---|---|---|---|
| Inventive example 9 | SEM layer thicknesses [nm] Oxygen O₂ [atom %] | 9a Al 25 | 9b Cr, oxide-containing 20 | 9a Al 62 | 9b Cr, oxide-containing 53 |
| Inventive example 10 | SEM layer thicknesses [nm] Oxygen O₂ [atom %] SEM layer thicknesses [nm] Oxygen O₂ [atom %] | 10a Al 40 70 | 10b Cr, oxide-containing 19 | 10a Al 62 9.5 | 10b Cr, oxide-containing 53 53 |

TABLE 2b

Physical data for layer thicknesses and oxygen contents in relation to comparative examples 1 to 8

| Sample | | Layer or layer sequence of vaporized metal | EDX |
|---|---|---|---|
| Comparative example 1 | SEM layer thickness [nm] Oxygen O₂ [atom %] | Cr about 46 | about 40-43 |
| Comparative example 2 | SEM layer thickness [nm] Oxygen O₂ [atom %] | Cr about 52 | about 40-43 |
| Comparative example 3 | SEM layer thickness [nm] Oxygen O₂ [atom %] | Cr about 56 | about 40-43 |
| Comparative example 4 | SEM layer thickness [nm] Oxygen O₂ [atom %] | Cr about 66 | about 40-43 |
| Comparative example 5 | SEM layer thickness [nm] Oxygen O₂ [atom %] | Cr about 70 | about 40-43 |
| Comparative example 6 | SEM layer thickness [nm] Oxygen O₂ [atom %] | Cr about 84 | about 40-43 |
| Comparative example 7 | SEM layer thickness [nm] Oxygen O₂ [atom %] | Cr about 110 | about 40-43 |
| Comparative example 8 | SEM layer thickness [nm] Oxygen O₂ [atom %] | Cr about 130 | about 40-43 |

Part D: Characterization by Photoelectron Spectroscopy (XPS/ESCA) and Sputter Profile Measurements For more precise structural characterization, the coated films of inventive examples 1 to 6 and also of comparative example 8 were analyzed by means of ESCA. For better resolution of the compositions of the inner layers, they were subjected to continuous sputtering (Ar⁺ ions) and measured anew in each case. Measurement here took place in respect of the elements oxygen, metal (Al or Cr), nitrogen, and carbon in each case. The measurements were carried out using an ESALAB 250 instrument from VG Scientific. Excitation took place using monochromatic Al Kα X-ray radiation (excitation voltage: 15 kV; power: 150 W; spot size: 500 μm). The transmission function of the instrument was measured on a copper sample. Charge compensation took place using a "flood gun", with an electron energy of 6 eV/0.05 mA beam current. The energy scale was set for the evaluation in such a way that the carbon main line was at 285 eV.

First of all, overview spectra were recorded with a pass energy of 80 eV. From these spectra, the surface composition in atom % of the four elements identified above was determined quantitatively using what are called Scofield Factors, the measurement error being approximately 10%. All of the evaluations were based on the assumption that the volume analyzed is inherently homogeneous. Photoelectron spectroscopy is a surface-sensitive method with an information depth of typically 5-10 nm.

Subsequently, with a pass energy of 30 eV, high-resolution spectra of the individual elements were recorded. In the case of the metal spectra in particular, it was possible here to make a distinction between different oxidation states of the metal. In the case of aluminum samples (examples 1 to 3), the fractions of elemental (metallic) aluminum and Al(III) were determined quantitatively in each case. In the case of chromium samples (examples 4 to 6, comparative example 8), elemental chromium, on the one hand, and also the oxidation states Cr(III), Cr(IV), and Cr(VI) were distinguished. The partially overlapping energy spectra were adapted and compared by means of known, standardized techniques. For all of the chromium samples, there was no measurable fraction of chromium(VI) detectable.

By means of sputtering in accordance with manufacturer instructions, the layer thickness of the respective PVD metallic effect pigment was ascertained. The standard used in each case was a metal such as aluminum or chromium or their oxides. A certain systematic error may be obtained in that the PVD layers investigated do not necessarily behave like the standard materials in terms of their sputter removal properties.

The concentration profiles of the oxygen, metal, and carbon contents over the layer thickness, determined from the sputter rate, for PVD layers, vapor-applied to the substrate films, in inventive examples 1 to 6 and in comparative example 8 are shown in FIGS. 14a, 15a, 16a, 17a, 18a, 19a, and 20a. The carbon content comes either from superficial contamination or from the substrate film, if the vapor-applied coating is sputtered through. The concentration of nitrogen was not shown, since it was always well below 2 atom % and did not exhibit any gradient at all.

For the metal concentration, on the one hand, the total metal fraction in atom % has been reported. From the evaluation of the high-resolution spectra, a determination was made of the fraction of elemental metal, which is indicated as an additional parameter in the figures. The concentrations shown here relate in each case to the sum of the concentrations of the measured elements oxygen, metal, carbon, and nitrogen.

Table 3 shows the results of the evaluations on the layer thickness profiles. These results are elucidated in more detail below.

All of the figures share a certain value initially (prior to sputtering) for the carbon signal. This signal came from contaminations of the pigment surface with organic material, and had no analytical significance. From the first, initial region it was likewise apparent that there was always a relatively high oxygen content and, correspondingly, a relatively low metal fraction. This finding was attributable to the metal oxide layer which forms naturally. These values were not considered any further in the subsequent evaluation, particularly as regards the consideration of concentration gradients.

In the interior of the PVD metallic effect pigment, the carbon signal, as expected, is very small (<1 atom %), before suddenly then growing very strongly. Here, the vapor-applied metal/metal oxide layers had been eroded by the sputtering, and, correspondingly, the underlying polymer film was detected metrically. On the basis of the rise in the carbon signal and of the corresponding fall in particular in the metal signal, it was possible, on the basis of the point of intersection of the best-fit lines, to determine the overall layer thickness (shown by way of example in FIG. 14a). These values are plotted in table 3. Likewise given therein are the values for the pigment layer thicknesses determined by means of REM. Since the measurements with reflection electron microscopy (REM) showed a relatively high accuracy, a correction factor was ascertained. All further details relating to layer thicknesses and/or concentration gradients for individual layers of the PVD-coated films analyzed, in table 3, always relate to the values corrected by this factor. Consequently, the layer thicknesses determined by means of sputter rates were always standardized to those of the REM measurements.

Furthermore, the average amounts of oxygen in the PVD layers were ascertained. This was done on the one hand by means of the EDX method, which has also already been described in DE 10 2007 007 908 A1. On the other hand, the ESCA data were averaged. Both values showed relatively good agreements and are situated within a range from 40 to 46 atom %.

TABLE 3

Results from ESCA sputter profiles and REM/EDX measurements

| | | Layer thicknesses, pigment | | | Oxygen contents (based on M + O) | | |
|---|---|---|---|---|---|---|---|
| | | | | | Total content | Total content according to ESCA averages [atom %] | ESCA averages for individual layers [atom %] |
| Sample | FIG. | From REM [nm] | From sputter profiles (tangent method) [nm] | Correction factor | Total content from EDX [atom %] | | |
| Example 1 one tangent | 14 | 160 | 144 | 1.100 | 42 | 45 | 47 |
| Example 1 from three tangents | 14 | | | | | | 52<br>50<br>41 |
| Example 2 from three tangents | 15 | 160 | 142 | 1.120 | — | 36 | 45<br>24<br>13 |
| Example 3 from one | 16 | 155 | 125 | 1.270 | 45 | 44 | 43 |
| Example 4 from three tangents | 17 | 110 | 172 | 0.630 | 47 | 48 | 43<br>49<br>52 |
| Example 5 (two-stage) | 18 | 100 | 112 | 0.890 | 47 | 41 | 53<br>35 |
| Example 6 | 19 | 130 | 152 | 0.860 | 48 | 43 | 51<br>42<br>35 |
| Comparative example 8 from two tangents | 20 | 130 | 140 | 0.928 | 41 | 42 | 42<br>40 |

| | Oxygen contents (based on M + O) | | Amounts of elemental metal M (0) (based on Mtot + O) | | | | |
|---|---|---|---|---|---|---|---|
| Sample | Gradient slopes for individual layers, ESCA [atom %/nm] | Corrected thicknesses for individual layers [nm] | Maximum concentration M (0) [atom %] | Minimum concentration M (0) [atom %] | Oc M (0) in the pigment [atom %] | Maximum gradient slope [atom %/nm] | Layer thicknesses of individual layers [nm] |
| Example 1 one tangent | −0.15 | 154 | | | | | |
| Example 1 from three tangents | −0.19<br>−0.05<br>−0.18 | 22<br>33<br>99 | 38 | 0 | 38 | 0.40 | 73 |
| Example 2 from three tangents | −0.16<br>−1.62<br>0.23 | 90<br>22<br>34 | 83 | 3 | 80 | 3.56 | 44 |
| Example 3 from one | −0.22 | 140 | 46 | 2 | 44 | 0.51 | 77 |

TABLE 3-continued

Results from ESCA sputter profiles and REM/EDX measurements

| | | | | | | | |
|---|---|---|---|---|---|---|---|
| Example 4 from three tangents | 0.04 0.17 0.00 | 45 19 38 | 40 | 15 | 25 | −0.20 | 99 |
| Example 5 (two-stage) | −0.01 −0.92 | 53 36 | 62 | 3 | 59 | 2.38 | 49 |
| Example 6 | −0.08 −0.25 −0.04 | 26 52 43 | 43 | 2 | 41 | 0.48 | 52 |
| Comparative example 8 from two tangents | −0.01 −0.26 | 102 19 | 23 | 18 | 5 | 0 0.18 | 41 48 |

The individual PVD layers or PVD layer stacks were also analyzed for their structure. Parameters employed were firstly the concentration profile of the oxygen concentration and secondly the concentration profile of elemental metal. FIGS. 14 and 15 show, by way of example, how individual regions with different gradients can be distinguished by best-fit lines. On that basis, sections of individual regions with different gradients were able to be determined from the intersections of the best-fit lines, and also the slopes of the best-fit lines, the concentration gradients.

For certain PVD layers or PVD layer stacks there were a number of possible interpretations. For instance, the single-layer PVD layer of inventive example 1 was able to have a continuous, largely linear gradient in the oxygen concentration, or three slightly different gradients. Corresponding values for both interpretations have been adopted in table 3. On account of the small difference in gradient, the interpretation in the form of a single gradient appeared most fitting. The construction of the two-layer PVD metallic effect pigments in accordance with inventive examples 2 and 5 is readily apparent in FIGS. 15a and 18a, respectively, through a significant change in the slope (increase) in the amount of elemental metal (Al(0) and Cr(0), respectively) and through the significant change in the slope (decrease) for the amount of oxygen (O) over the layer thickness.

In the PVD layer in accordance with inventive examples 4 and 6, three gradients can be interpreted in each case.

All of the gradient slopes that are highest in terms of amount for the oxygen concentration are marked in table 3 in each case in bold; of the gradients for the elemental metal, only the highest values in each case have been entered.

The PVD layers of inventive examples 2 and 5, prepared by means of a two-stage method, contained a PVD metal layer. In FIGS. 15 and 18, the sharp increase in the concentration of elemental metal can be seen. The values, however, do not climb to 100%, and there is always a residual oxygen fraction still in evidence.

Comparative example 8 corresponds to example 1 of DE 10 2007 007 908 A1 (FIG. 20) and gave a large layer-thickness range with a virtually constant oxygen concentration and concentration of elemental metal (Cr(0)). Only at the end of the PVD layer, at a layer thickness of approximately 110 to 120 nm, did the value increase slightly, with a parallel increase in the C signal and hence the end of the pigment having been reached, which is why this increase in the metal concentration represents an artifact.

For the sake of completeness, this narrow end region as well was evaluated and the resultant artificial slight concentration gradient of oxygen was ascertained. This PVD layer therefore has a largely constant oxygen concentration, as described in DE 10 2007 007 908 A1.

From table 3 it is apparent that the maximum oxygen concentration gradient in the case of the PVD layer or PVD layers (PVD metallic effect pigments) in accordance with the inventive examples is always higher than in the case of comparative example 8.

The above-described measurements by means of TEM had shown that the elemental metal is in the form of small nanoparticles embedded in the metal oxide matrix. For the optical properties of the PVD metallic effect pigment, the asymmetric concentration distributions of these metallic nanoparticles in the PVD metallic effect pigment, in particular, were critical.

In addition to the gradient slopes, in particular, the maximum and minimum concentrations and also the different ΔCM(0) (CM(0): concentration of elemental metal) of these concentrations in the PVD layers were ascertained. Particularly in the case of the maximum concentrations CM(0) and in the case of the differences, significant differences were apparent in the PVD layers in accordance with the inventive examples, in relation to the PVD layer in accordance with comparative example 8.

The PVD layers in accordance with the inventive examples gave substantially higher maximum concentrations CM(0) and substantially higher concentration differences ΔCM(0) than the PVD layer in accordance with comparative example 8, which was largely homogeneous. For the PVD layer in accordance with comparative example 8, the artificial concentration difference ΔCM(0) was 5 atom % (see table 3).

In contrast to the largely homogeneously constructed PVD metallic effect pigments in accordance with the prior art, the PVD metallic effect pigments of the invention gave greater concentration differences over the layer thickness, with the difference ΔCM(0) between the outer faces of the PVD metallic effect pigment of the invention being at least 10 atom %, preferably at least 15 atom %, more preferably at least 20 atom % (see table 3).

In accordance with the invention it is not critical whether, in a PVD layer, there are one or more gradients in relation to the concentration of elemental metal. What is critical, instead, is whether there is a concentration gradient of elemental metal over the entire PVD layer thickness. In between there may be sections with constant concentration or even slightly falling concentration.

Part E: Colorimetric Evaluation of the PVD Layers in Accordance with the Inventive Examples in Relation to the PVD Layers in Accordance with the Comparative Examples (Examples with Largely Homogeneous Composition, without Gradient of Elemental Metal)

Set out below is the colorimetric behavior of the PVD metallic effect pigments in accordance with the inventive examples and in accordance with the comparative examples.

For this purpose, each of the PVD metallic effect pigments was incorporated by stirring into 2 g of a conventional nitrocellulose varnish (Dr. Renger Erco Bronzemischlack 2615e; from Morton). The PVD metallic effect pigment was introduced first, and then dispersed into the varnish using a brush.

The completed varnish was applied to #2853 test charts from Byk Gardner (black/white contrast paper) with a wet film thickness of 50 μm, using a doctor-blade drawdown device.

The level of pigmentation (amount of PVD metallic effect pigment) was selected so as to give a hiding coat. As a result, the effect of the substrate does not form part of the colorimetric data.

The doctor-blade drawdowns were subjected to colorimetry in accordance with manufacturer indications (Optronic Multiflash instrument, Berlin, Germany). Irradiation took place with a constant angle of 45°, and the CIELAB L*, a*, and b* values were determined at observation angles of 15°, 20°, 25°, 45°, 55°, 70°, 75°, and 110° relative to the specular angle (illuminant: D65).

Tables 4a and 4b summarize the colorimetric data for the PVD metallic effect pigments in accordance with inventive examples 1-10 and in accordance with comparative examples 1-8.

TABLE 4a

Colorimetric data for doctor-blade drawdowns of the PVD metallic effect pigments of the inventive examples

| Sample | Level of pigmentation [%] | D 50: [μm] | Lightnesses | | | | Subjective color impression |
|---|---|---|---|---|---|---|---|
| | | | L15 | L45 | L110 | Flop | |
| Inv. ex. 1 | 5 | 15 | 96.9 | 10.2 | 3.3 | 56.1 | Yellowish gray metallic lustrous |
| Inv. ex. 2 | 4.7 | 18.5 | 110.7 | 14.2 | 6.9 | 47.6 | Silver gray metallic lustrous |
| Inv. ex. 3 | 4.7 | about 15 | 114.7 | 22.8 | 11.5 | 31.4 | Silver gray pale red metallic |
| Inv. ex. 4 | 8 | 11.3 | 77.5 | 17.1 | 4.2 | 27.5 | Pale gray green-blue metallic lustrous |
| Inv. ex. 5 | 6.5 | 9.6 | 103.1 | 26.1 | 6.1 | 26.1 | Pale gray green-blue metallic lustrous |
| Inv. ex. 6 | 9.5 | about 15 | 76.2 | 7.6 | 1.8 | 56.4 | Steel gray lustrous metallic |
| Inv. ex. 7 | 11 | 15.3 | | | | | Silver gray metallic lustrous |
| Inv. ex. 8 | 5.2 | 12 | 121.6 | 36.6 | 19 | 20.8 | Bluish pale gray metallic lustrous |
| Inv. ex. 9 | 5.8 | 13 | 105.7 | 58.9 | 44.8 | 7.7 | Bluish light metallic |
| Inv. ex. 10 | 6.8 | 12 | 86.0 | 64.1 | 52.7 | 3.7 | Bluish light metallic |

TABLE 4b

Colorimetric data for doctor-blade drawdowns of the PVD metallic effect pigments of the comparative examples

| Sample | Level of pigmentation [%] | D 50: [μm] | Lightnesses | | | | Subjective color impression |
|---|---|---|---|---|---|---|---|
| | | | L15 | L45 | L110 | Flop | |
| Comp. ex. 1 | 2.9 | about 15 | 102.7 | 23.2 | 6.7 | 28.5 | Pale gray lustrous |
| Comp. ex. 2 | 4.3 | about 15 | 104.8 | 22.9 | 7.1 | 29.4 | Green-gray lustrous |
| Comp. ex. 3 | 5.3 | about 15 | 102.3 | 21.1 | 6.6 | 30.9 | Beige lustrous |
| Comp. ex. 4 | 6.2 | about 15 | 95.1 | 19.8 | 6.8 | 29.9 | Brown lustrous |
| Comp. ex. 5 | 7.1 | about 15 | 90.5 | 15.1 | 4.5 | 36.5 | Red-brown lustrous |
| Comp. ex. 6 | 8.1 | about 15 | 84.7 | 12.4 | 3.5 | 40.7 | Brown-violet lustrous |
| Comp. ex. 7 | 8.9 | about 15 | 82.5 | 11.3 | 3.3 | 43.0 | Violet-black lustrous |
| Comp. ex. 8 | 9.1 | about 15 | 80.0 | 10.2 | 2.6 | 45.4 | Steel blue lustrous |

In terms of lightness flop, the colorimetric properties of the PVD metallic effect pigments of the inventive examples and comparative examples were substantially comparable. However, the PVD metallic effect pigments of the invention mostly showed a strong gray-metallic character. This character, however, interestingly, had a very high lightness flop, hitherto unobtainable in the prior art.

In contrast to the PVD metallic effect pigments in accordance with the comparative examples, all of the PVD metallic effect pigments of the invention are produced with substantially higher belt speeds and with a considerably greater reproducibility. Since metallic effect pigments represent a product which must be able to be produced in large quantities and with good reproducibility, the present invention represents a significant economic advance. Furthermore, it is now possible to provide gray and grayish PVD metallic effect pigments, something which was hitherto not possible.

Figure 21:
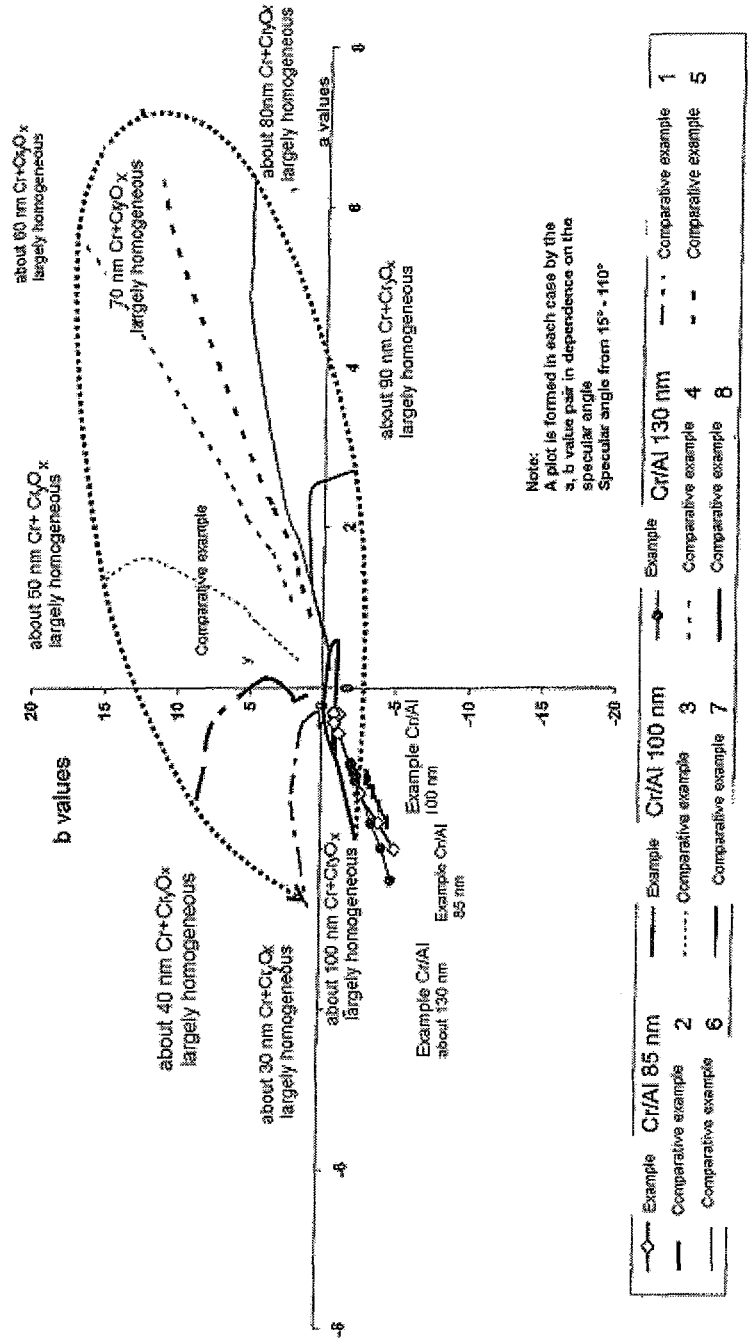
FIG. 21 represents colorimetric CIELAB data in the a*,b* plane for different inventive and comparative examples.

FIG. 21 shows, in a CIELAB a*, b* representation, the colorimetric representation of inventive PVD metallic effect pigments and of PVD metallic effect pigments from comparative examples.

From FIG. 21 it is evident that the PVD metallic effect pigments of the invention, in accordance with inventive examples 8, 9, and 10, are sited at the same color locus, irrespective of their particular overall layer thicknesses. With the PVD metallic effect pigments in accordance with the comparative examples, each with only one layer with largely homogeneous composition, the change in layer thickness results in a traversal of the entire color space—see FIG. 21.

A comparison of the PVD metallic effect pigment in accordance with inventive example 8 with the PVD metallic effect pigment of comparative example 8 shows that the color locus is approximately the same, but with the difference that the overall layer thickness of the PVD metallic effect pigment of inventive example 8 is lower by 45 nm than that of the PVD metallic effect pigment in accordance with comparative example 8.

Advantages of the PVD Metallic Effect Pigments of the Invention

The PVD metallic effect pigments of the invention have generally surprising advantages:

Inexpensively coated and/or available, single-sidedly or double-sidedly coated metallized sheets, examples being aluminum foils, can be used, which are provided preferably with a release coat between metal layer—aluminum layer, for example—and substrate—typically a polymeric film in strip form.

Atop this metal layer, aluminum layer for example, it is then possible, with a—for example—one-layer PVD coating operation, to apply a further metal/metal oxide layer which features an elemental metal gradient in accordance with the invention. Atop the aluminum layer, for example, it is possible for there to be, or have been, applied a chromium layer having an asymmetric construction of elemental chromium in chromium oxide.

Through the use of only a 60 nm chromium/oxidic chromium layer on the stated aluminum foil, the productivity is doubled; materials costs for Cr are halved. These advantages may make a two-coat method less expensive than a single-coat belt method, in which a layer thickness of oxidic Cr, of largely homogeneous composition, of 130 nm is needed.

A further process engineering advantage arises from a lower thermal load during the coating operation with metal/metal oxide, such as with chromium/chromium oxide, for example, on the sheet, since this coating operation, as a result of the increase in the belt speed, reduces the thermal load. In the case of a doubling of the belt speed, for example, the thermal load on the sheet or on the substrate is halved.

This advantage is of course not confined to the specific combination of aluminum foil and chromium/chromium oxide. Generally speaking, therefore, a substrate, preferably a plastics strip, already coated with a metal can be used, and this precoated substrate can be subsequently coated with an asymmetric PVD layer of metal oxide and elemental metal by means of PVD.

On account of the asymmetrical construction with a more metallic first outer face and a more oxide-rich second outer face, more discreet hues, particularly in the desired gray range, are obtained in one application, where statistically 50% of the PVD metallic effect pigments with the more metallic outer face and 50% of the PVD metallic effect pigments with the more oxide-rich outer face are turned toward the eye of an observer, these hues nevertheless having a strong light/dark flop. On account of this particular distribution of the asymmetric PVD metallic effect pigments, any color fluctuations that may be induced by the clusters of elemental metal embedded in the metal oxide are compensated or attenuated on account of the asymmetry of the PVD metallic effect pigments, something which with symmetrical PVD pigments is not possible.

On account of a more metallic outer face of the PVD metallic effect pigments of the invention, they possess an outstanding specific covering capacity, i.e., a high level of hiding of a substrate per unit weight of pigment.

The method of the invention can be implemented very advantageously in a belt travel procedure, and the monitoring of the asymmetric PVD layer or layers applied can be accomplished very effectively via reflectance measurement. This is possible even when producing a two-layer PVD metallic effect pigment, since the optically active asymmetric PVD layer is largely not dependent on the layer thickness of a second metallic PVD layer that is present.

The PVD metallic effect pigments of the invention can be produced with higher layer thicknesses as well, and in respect of the greater mass exhibit better application behavior by comparison with conventional PVD metallic effect pigments, in aqueous coating applications, for example.

What is claimed is:

1. A platelet-shaped PVD metallic effect pigment having first and second outer faces,
    wherein the platelet-shaped PVD metallic effect pigment has at least one PVD layer, the at least one PVD layer comprising elemental metal with clusters of elemental metal and metal oxide, the amount of elemental metal in the first outer face and in the second outer face of the PVD metallic effect pigment being different from one another and differing by at least 10 atom %.

2. The platelet-shaped PVD metallic effect pigment of claim 1,
    wherein the platelet-shaped PVD metallic effect pigment has two PVD layers arranged one atop the other, each comprising elemental metal with clusters of elemental metal and metal oxide, the amount of elemental metal in the first outer face and in the second outer face of the PVD metallic effect pigment being different from one another and differing by at least 10 atom %.

3. The platelet-shaped PVD metallic effect pigment of claim 1,
    wherein the platelet-shaped PVD metallic effect pigment has three or more PVD layers arranged one above another, all of the PVD layers each comprising elemental metal with clusters of elemental metal and metal oxide, and the highest amount of elemental metal being present either in the first outer face or in the second outer face of the PVD metallic effect pigment, and the amount of elemental metal in the first outer face and in the second outer face of the PVD metallic effect pigment being different from one another and differing by at least 10 atom %.

4. The platelet-shaped PVD metallic effect pigment of claim 1,
    wherein the amount of elemental metal in the at least one PVD layer changes continuously over the thickness of the PVD layer.

5. The platelet-shaped PVD metallic effect pigment of claim 4,
    wherein the amount of elemental metal in the at least one PVD layer changes at least partly with a gradient of 0.1 to 4 atom %/nm of PVD layer thickness.

6. The platelet-shaped PVD metallic effect pigment of claim 1,
    wherein the amount of elemental metal changes discontinuously between two successive PVD layers.

7. The platelet-shaped PVD metallic effect pigment of claim 1,
    wherein the amount of elemental metal in the first outer face of the metallic pigment is in a range from 0 to 60 atom %,
    with the proviso
    that the difference in the amount of elemental metal between the first and second outer faces of the PVD metallic effect pigment is at least 10 atom %.

8. The platelet-shaped PVD metallic effect pigment of claim 1,
    wherein the metals of the at least two PVD layers arranged one above another are identical or different and are selected from the group consisting of aluminum, magnesium, chromium, silver, copper, gold, zinc, tin, manganese, iron, cobalt, nickel, titanium, tantalum, molybdenum, mixtures thereof, and alloys thereof.

9. The platelet-shaped PVD metallic effect pigment of claim 1,
    wherein the thickness of the at least one PVD layer is in a range from 10 to 500 nm.

10. The platelet-shaped PVD metallic effect pigment of claim 1,
wherein the elemental metal is present at least partly in the form of clusters.

11. The platelet-shaped PVD metallic effect pigment of claim 1,
wherein the platelet-shaped PVD metallic effect pigment is enveloped with an anticorrosion layer, said anti-corrosion layer being optionally surface-modified.

12. A coating composition
wherein the coating composition comprises platelet-shaped PVD metallic effect pigments of claim 1.

13. The coating composition of claim 12,
wherein the coating composition is selected from the group consisting of coatings, paints, automobile finishes, powder coating materials, printing inks, digital-printing inks, plastics, and cosmetic formulations.

14. A coated article
wherein the article is provided with platelet-shaped PVD metallic effect pigments of claim 1.

15. A method for producing a platelet-shaped PVD metallic effect pigment,
wherein the method comprises the following steps:
(a) coating a linearly moving substrate in a vacuum chamber having a vapor deposition section, by means of reactive physical vapor deposition (PVD), with at least one metal in the presence of oxygen, so that part of the metal reacts with oxygen to form metal oxide, and unreacted metal and metal oxide formed are deposited in asymmetric distribution over the vapor deposition section in relation to the movement direction of the linearly moving substrate, to give a PVD layer or a plurality of PVD layers arranged one above another,
(b) detaching the applied PVD layer or layers,
(c) comminuting the detached PVD layer or layers, and
(d) optionally converting the comminuted PVD layer or layers into a dispersion or paste.

16. The method for producing the platelet-shaped PVD metallic effect pigment of claim 15,
wherein in step (a) the coating of a linearly moving substrate in a vacuum chamber by means of physical vapor deposition (PVD) takes place with at least one metal from at least one metal vapor source in the presence of oxygen, the oxygen being introduced into the vacuum chamber in asymmetric distribution in at least one of quantitative and spatial terms in relation to the movement direction of the substrate and in relation to the at least one metal vapor source.

17. The method of claim 15,
wherein in step (a) the oxygen is introduced via an addition means largely centrally into the metal vapor given off from at least one metal vapor source, there being provided, between the linearly moving substrate on the one hand and the metal vapor source and also the addition means for oxygen, on the other hand, one or more shutters which limit the vapor deposition section and form a shutter aperture, the shutter aperture being arranged asymmetrically in relation to the at least one metal vapor source and also to at least one addition means for oxygen.

18. The method of claim 15,
wherein the substrate used in step (a) is provided with a metal layer, or is a metal foil.

19. A coated article, wherein the article is provided with a coating composition according to claim 12.

20. The platelet-shaped PVD metallic effect pigment of claim 7, wherein the amount of elemental metal in the second outer face of the metallic pigment is in a range from 30 to 95 atom %.

21. The platelet-shaped PVD metallic effect pigment of claim 10, wherein the clusters have an average particle size in a range from 1 nm to 10 nm.

22. The method of claim 18, wherein said metal layer is applied by physical vapor deposition (PVD).

\* \* \* \* \*